United States Patent
Sjöberg et al.

(10) Patent No.: US 11,284,080 B2
(45) Date of Patent: Mar. 22, 2022

(54) DECODED PICTURE BUFFER MANAGEMENT FOR HANDLING CROSS-PICTURE DATA PREDICTION

(71) Applicant: Telefonaktiebolaget LM Ericsson (publ), Stockholm (SE)

(72) Inventors: Rickard Sjöberg, Stockholm (SE); Martin Pettersson, Vallentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/474,916

(22) PCT Filed: Dec. 11, 2017

(86) PCT No.: PCT/SE2017/051246
§ 371 (c)(1),
(2) Date: Jun. 28, 2019

(87) PCT Pub. No.: WO2018/124957
PCT Pub. Date: Jul. 5, 2018

(65) Prior Publication Data
US 2019/0335179 A1    Oct. 31, 2019

Related U.S. Application Data

(60) Provisional application No. 62/440,657, filed on Dec. 30, 2016.

(51) Int. Cl.
*H04N 19/132* (2014.01)
*H04N 19/105* (2014.01)
(Continued)

(52) U.S. Cl.
CPC ........ *H04N 19/132* (2014.11); *H04N 19/105* (2014.11); *H04N 19/172* (2014.11); *H04N 19/46* (2014.11)

(58) Field of Classification Search
USPC .................................................. 375/240.02
See application file for complete search history.

(56) References Cited

U.S. PATENT DOCUMENTS

2002/0094028 A1* 7/2002 Kimoto ............... H04N 19/176
                                                        375/240.14
2013/0022104 A1* 1/2013 Chen ..................... H04N 19/61
                                                        375/240.02
(Continued)

FOREIGN PATENT DOCUMENTS

WO    2013/012792 A2    1/2013
WO    2014/107583 A1    7/2014

OTHER PUBLICATIONS

International Search Report and Written Opinion issued in International Application No. PCT/SE2017/051246, dated Apr. 20, 2018, 16 pages.

(Continued)

*Primary Examiner* — Behrooz M Senfi
(74) *Attorney, Agent, or Firm* — Rothwell, Figg, Ernst & Manbeck, P.C.

(57) ABSTRACT

Data that is predicted across pictures in a video sequence is managed by separating the data into multiple data types. Instead of keeping all data associated with a decoded picture, such as picture sample values and motion vector data, data associated with a decoded picture is split by data type to enable storing only a subset of all data associated with a decoded picture.

23 Claims, 15 Drawing Sheets

(51) Int. Cl.
*H04N 19/172* (2014.01)
*H04N 19/46* (2014.01)

(56) References Cited

U.S. PATENT DOCUMENTS

| | | | |
|---|---|---|---|
| 2013/0077677 A1 | 3/2013 | Wang et al. | |
| 2013/0135431 A1* | 5/2013 | Chen | H04N 19/423 348/42 |
| 2013/0156332 A1* | 6/2013 | Tian | H04N 7/148 382/232 |
| 2014/0092964 A1* | 4/2014 | Ugur | H04N 19/52 375/240.12 |
| 2014/0126640 A1* | 5/2014 | Samuelsson | H04N 19/70 375/240.16 |
| 2014/0133556 A1* | 5/2014 | Chen | H04N 19/597 375/240.12 |
| 2014/0192895 A1* | 7/2014 | Chen | H04N 19/597 375/240.25 |
| 2014/0301466 A1* | 10/2014 | Li | H04N 19/105 375/240.16 |
| 2015/0172667 A1* | 6/2015 | Hendry | H04N 19/105 375/240.25 |
| 2016/0173887 A1* | 6/2016 | Deshpande | H04N 19/433 375/240.08 |
| 2016/0234492 A1* | 8/2016 | Li | H04N 19/70 |
| 2017/0111649 A1* | 4/2017 | Wang | H04N 19/30 |

OTHER PUBLICATIONS

Chen, J. et al. "Algorithm Description of Joint Exploration Test Model 4", Joint Video Exploration Team (JVET) of ITU-T SG 16 WP 3 and ISO/IEC JTC 1/SC 29/WG 11, Document: JVET-D1001_v3, 4th Meeting: Chengdu, CN, Oct. 2016, 39 pages.

Sjöberg, R. et al., "Overview of HEVC High-Level Syntax and Reference Picture Management", IEEE Transactions on Circuits and Systems for Video Techology, vol. 22, No. 12, Dec. 2012, pp. 1858-1870.

Sjöberg, R. et al., "JEM bug fix for ALF cross-picture prediction", Joint Video Exploration Team (JVET) of ITU-T SG 16 WP 3 and ISO/IEC JTC 1/SC 29/WG 11, Document: JVET-E0030, 5th Meeting: Geneva, CH, Jan. 2017, 4 pages.

International Telecommunications Union, ITU-T, H.265, Series H: Audiovisual and Multimedia Systems, Infrastructure of audiovisual services—Coding of moving video, High efficiency video coding (Apr. 2015), 634 pages.

Extended European Search Report dated Jan. 15, 2020 issued in European Patent Application No. 17887252.9. (11 pages).

Chen, J. et al., "Algorithm Description of Joint Exploration Test Model 4", Joint Video Exploration Team (JVET) of ITU-T SG 16 WP3 and ISO/IEC JTC 1/SC 29/WG 11; 4th Meeting: Chengdu, CN; Document: JVET-D1001_v3; Oct. 2016. (39 pages).

Ouedraogo, N. et al., "On APS referring and updating", Joint Collaborative Team on Video Coding (JCT-VC) of ITU-T SG 16 WP3 and ISO/IEC JTC 1/SC 29/WG 11; 9th Meeting: Geneva, CH; Document: JCTVC-I0189r1; May 2012. (14 pages).

Sjoberg, R. et al., "JEM bug fix for ALF cross-picture prediction", Joint Video Exploration Team (JVET) of ITU-T SG 16 WP 3 and ISO/IEC JTC 1/SC 29/WG 11; 5th Meeting: Geneva, CH; Document: JVET-E0030; Jan. 2017. (4 pages).

Benjamin Bross et al., "WD5: Working Draft 5 og High-Efficiency Video Coding", Joint Collaborative Team on Video Coding (JCT-VC) of ITU-T SG 16 WP3 and ISO/IEC JTC1/SC29/WG11, Document: JCTVC-G1103_d9, 7th Meeting: Geneva, CH, Nov. 21-30, 2011 (237 pages).

* cited by examiner

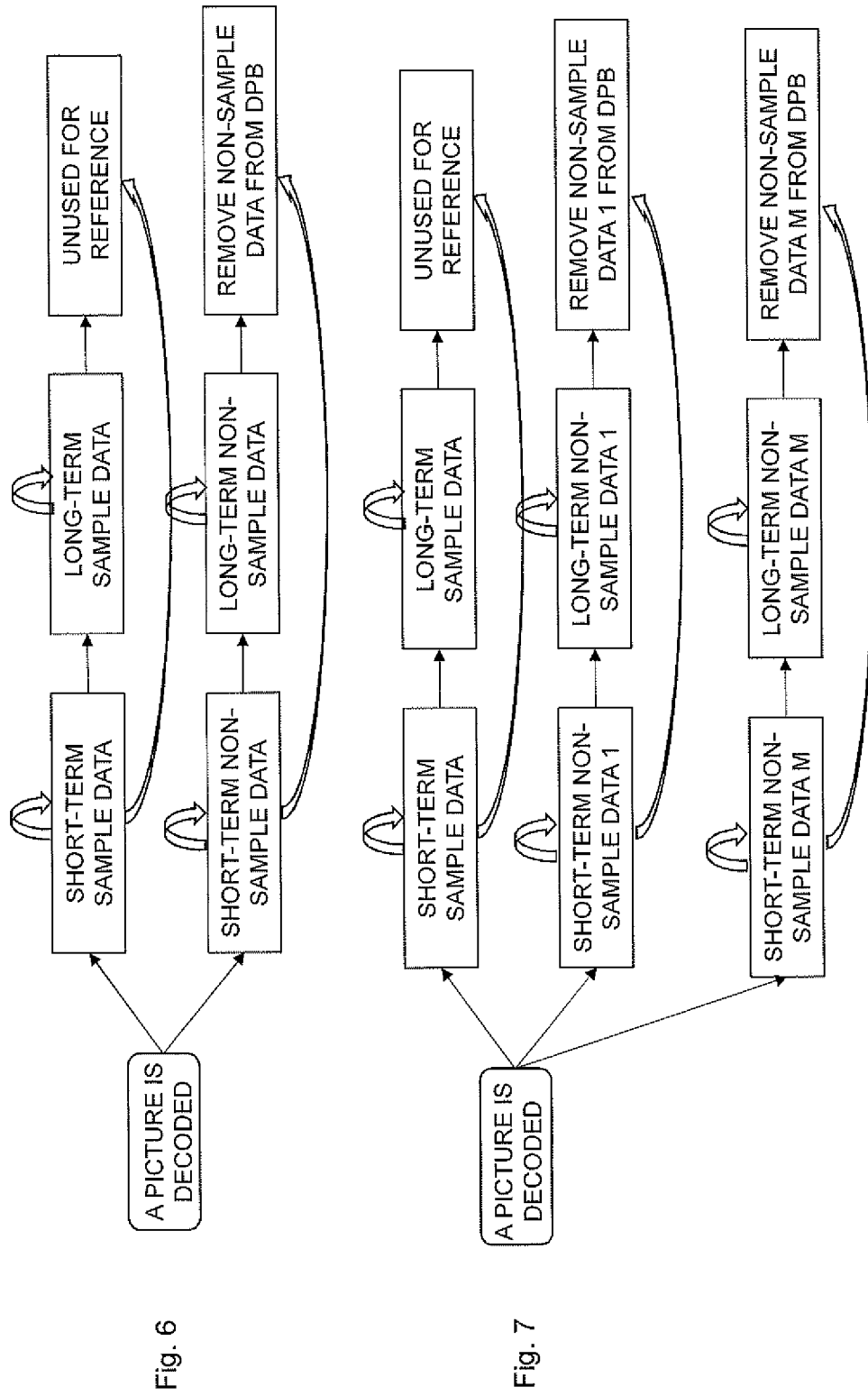

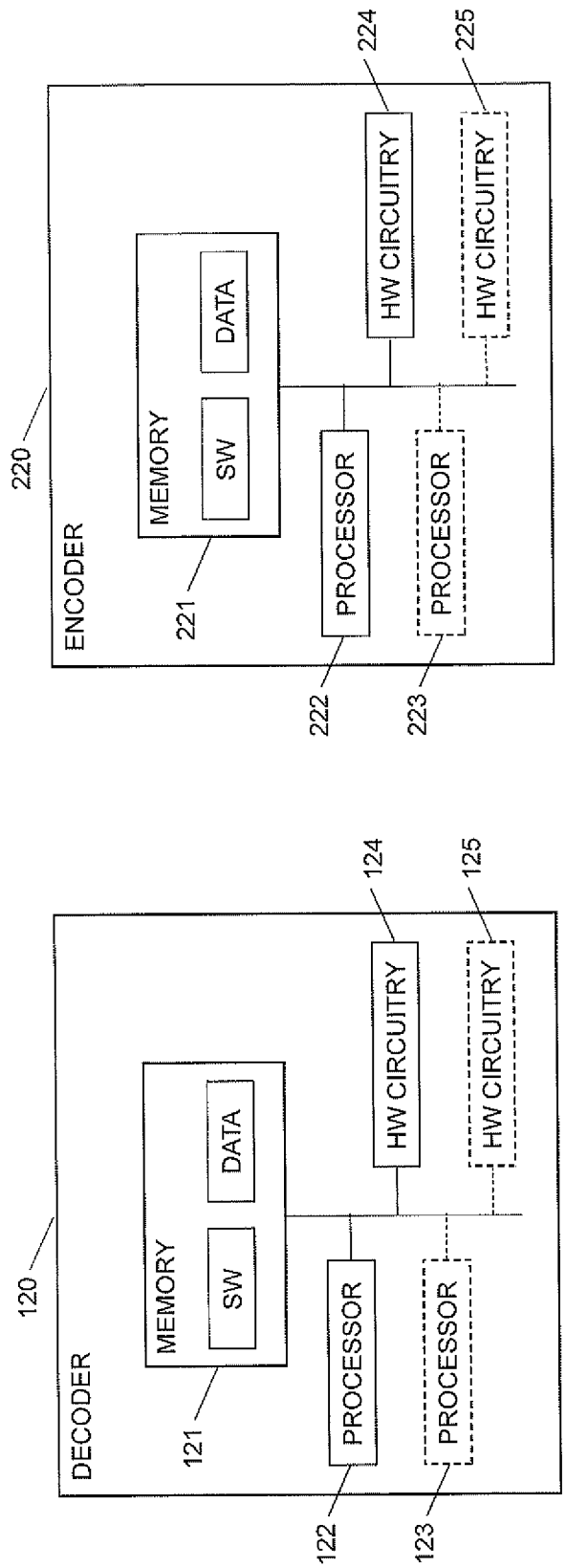

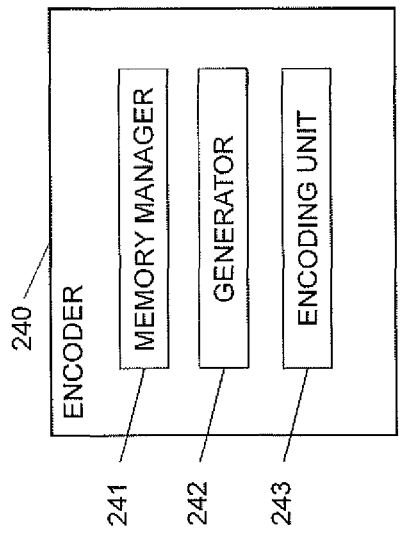
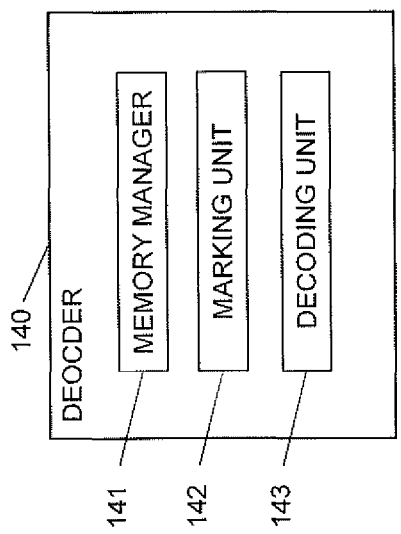

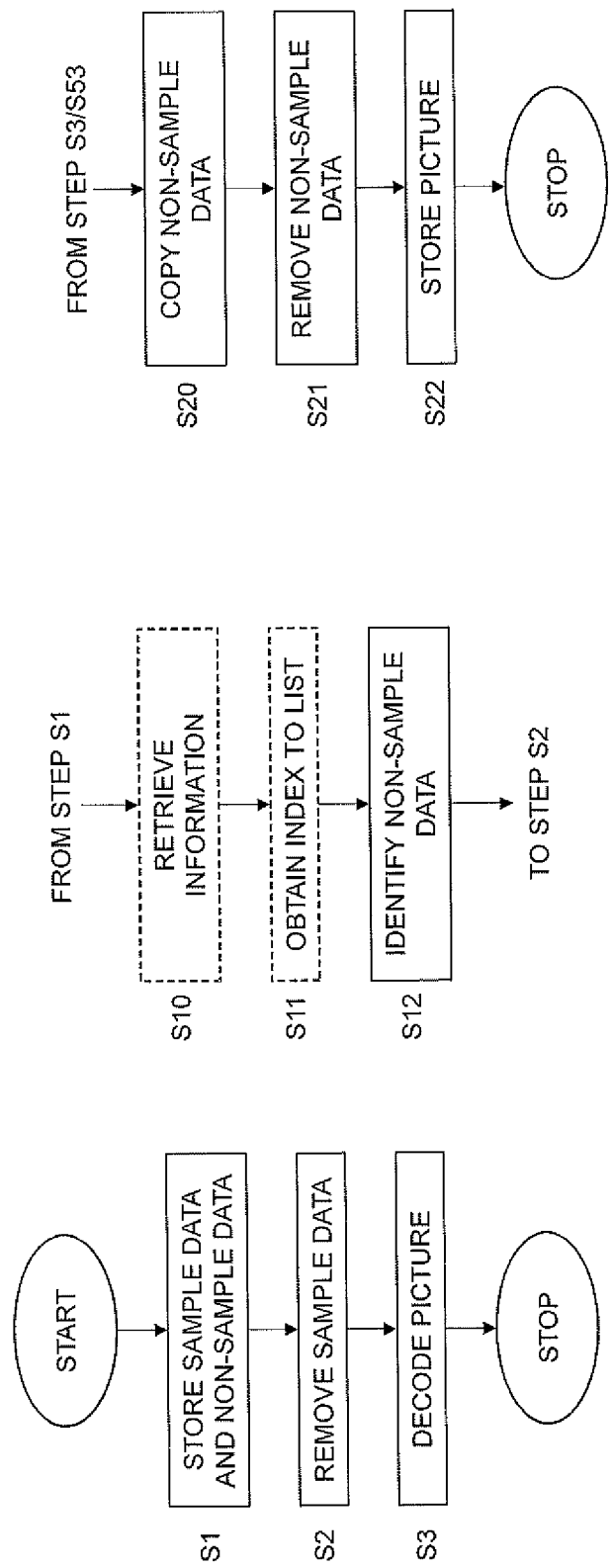

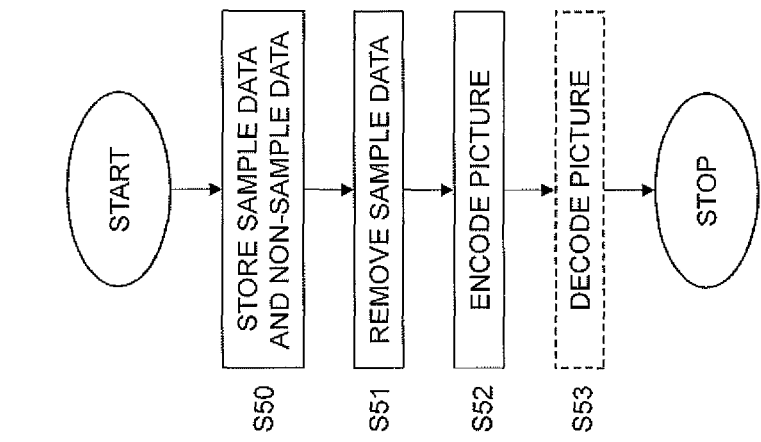
Fig. 29
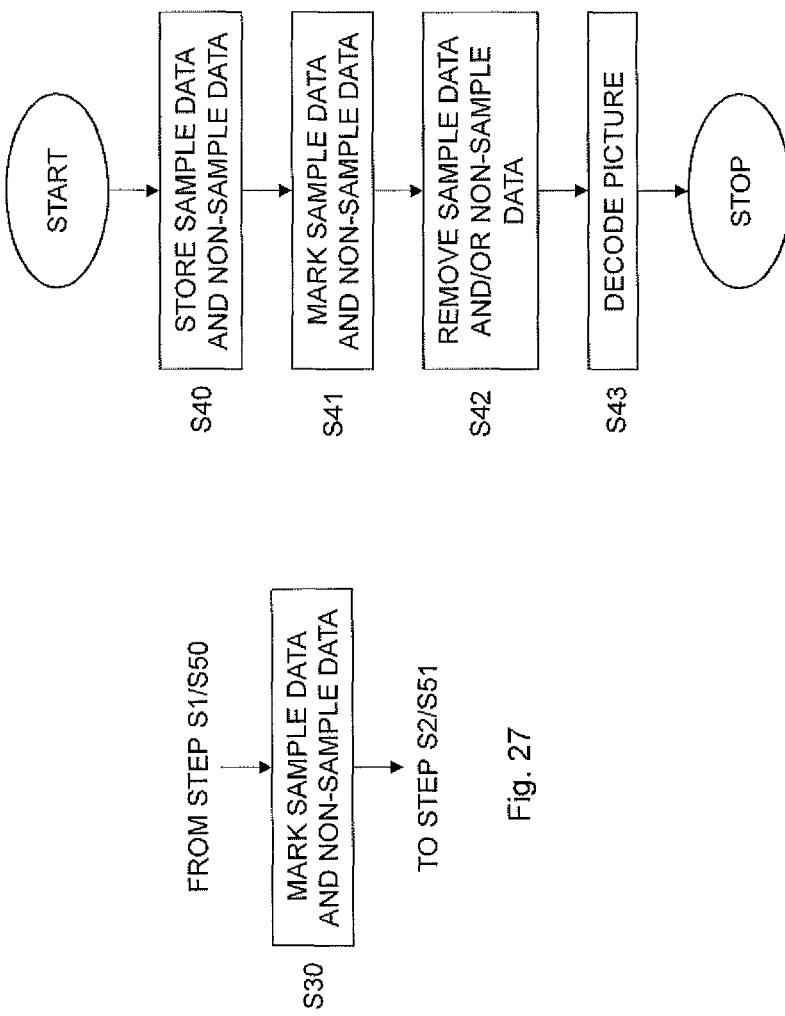
Fig. 28
Fig. 27

DECODED PICTURE BUFFER MANAGEMENT FOR HANDLING CROSS-PICTURE DATA PREDICTION

CROSS REFERENCE TO RELATED APPLICATION(S)

This application is a 35 U.S.C. § 371 National Stage of International Patent Application No. PCT/SE2017/051246, filed Dec. 11, 2017, designating the United States and claiming priority to U.S. provisional application No. 62/440,657 filed on Dec. 30, 2016. The above identified applications are incorporated by reference.

TECHNICAL FIELD

The present embodiments generally relate to encoding and decoding pictures of a video sequence, and in particular to handling cross-picture data prediction in connection with encoding and decoding pictures.

BACKGROUND

High Efficiency Video Coding (HEVC), also referred to as H.265, is a block based video codec standardized by ITU-T and MPEG that utilizes both temporal and spatial prediction. Spatial prediction is achieved using intra (I) prediction from within a current picture, also denoted frame in the art. Temporal prediction is achieved using uni-directional inter (P) or bi-directional inter (B) prediction on block level from previously decoded reference pictures. A residual, which is the difference between original sample values, also denoted original pixel values in the art, and the predicted sample values, also denoted predicted pixel values in the art, is transformed into the frequency domain, quantized and then entropy coded before transmitted together with necessary prediction parameters, such as mode selections and motion vectors, as a bitstream constituting an encoded representation of the video sequence. By quantizing the transformed residuals, the tradeoff between bitrate and quality of the video may be controlled. The level of quantization is determined by a quantization parameter (QP).

The decoder receives the bitstream, performs entropy decoding, inverse quantization and inverse transformation to obtain a decoded residual, and then adds the decoded residual to an intra or inter prediction to reconstruct sample values in a picture.

Context Adaptive Binary Arithmetic Coding (CABAC) is an entropy coding tool used in HEVC. CABAC encodes binary symbols, which keeps the complexity low and allows modelling of probabilities for more frequently used bits of a symbol. The probability models are selected adaptively based on local context, because coding modes are usually locally well correlated.

MPEG and ITU-T have recently started the development of the successor to HEVC within the Joint Video Exploratory Team (JVET). In the exploration phase, an experimental software codec called Joint Exploration Model (JEM) is being used, which is based on the HEVC reference codec software HM.

One tool that is part of JEM is Adaptive Loop Filtering (ALF). In the current version of ALF (JEM 3.1) one among 25 filters is selected for the luma component for each 2×2 sample block based on direction and activity of local gradients. Accordingly, up to 25 sets of luma filter coefficients could be signaled in the slice header. In order to reduce the bitrate, ALF parameter values, or ALF parameters for short, may alternatively be predicted from reference pictures. Thus, for each picture, there are three basic ALF options in JEM 3.1. The first option is to disable ALF for the picture. The second option is to use ALF and then send the ALF parameter values explicitly in the bitstream. The third option is to predict or copy ALF parameter values from a previously decoded picture, i.e., a reference picture. The option to use for each picture is signaled in the slice header. For ALF prediction, the decoding method in JEM involves storing ALF parameter values for the six most recently decoded pictures for which ALF parameters were explicitly signaled. The ALF parameter values are stored in a first-in first-out (FIFO) queue. This means that if the FIFO queue is full, a new set of ALF parameter values overwrites the oldest ALF parameter values in the FIFO queue. If a flag in the slice header specifies that prediction of ALF parameter values is done, then an index is signaled in the slice header and specifies which of the at most six previously decoded pictures to use for ALF prediction.

Cross-prediction of CABAC probability states for context models has also been proposed in JEM. After coding a centrally-located sample block in a picture, the probability states of context models are stored. These can then optionally be used as the initial CABAC probability state for subsequently decoded pictures. In JEM 3.1, the set of initial CABAC probability states for each inter-coded slice is copied from the stored CABAC probability states of a previously decoded picture that has the same slice type and the same slice level QP as the current slice.

The JEM methods of predicting ALF parameter values and CABAC probability states across pictures in a video sequence are very rudimentary. This may lead to a number of problems.

A problem with the existing solutions for predicting across pictures is that the encoder needs to control the prediction to ensure that there is no mismatch in the bitstream between the encoder side and the decoder side, such as in connection with temporal layer pruning or random access operations.

In video codec standards supporting temporal layers, such as HEVC, each picture of the video sequence belongs to a specific layer and the bitstream should be arranged so that decoding is possible when only a subset of the temporal layers is decoded. Higher layer pictures may use lower layer pictures for prediction but not the other way around. The process of removing high temporal layers from a bitstream is called temporal layer pruning.

Random access is the act of starting the decoding process for a bitstream at a point other than the beginning of the bitstream. It is typically done at an intra random access point (IRAP) picture. Random access should not be performed at a point where data prior to the random access point is needed for decoding subsequent pictures.

The current JEM method for prediction of ALF parameter values would force the encoder to disable ALF parameter prediction for some pictures that could have used it, in order to avoid encoder-decoder mismatch due to temporal layer pruning and random access operations.

Another problem is that decoding a subset of temporal layers is not working in JEM in connection with ALF or CABAC prediction. For instance, the state of the ALF FIFO queue will differ depending on whether a high temporal layer is decoded or not. If a high temporal layer is decoded, the ALF parameter values from that layer will be stored in the FIFO queue and the FIFO queue will hold other ALF parameter values as compared to the case when the high temporal layer is not decoded. Furthermore, if the slice quantization parameter (QP) of a picture in a higher temporal layer is the same as the slice QP of a slice in a current picture, it may well happen that the CABAC state of the higher temporal layer picture is used for the current picture. The problem is then that the higher temporal layer picture may not be received by the decoder if the bitstream has been pruned to contain only a subset of temporal layers.

Yet another problem is that the current JEM methods are not error robust. For instance, a FIFO queue with maximum six sets of ALF parameter values is built up from previously encoded/decoded pictures and an index is signaled to define which set of ALF parameter values to use. If a picture is lost, the current ALF prediction scheme may not be aware of this. Accordingly, ALF parameter values that have not been updated correctly may be used. Furthermore, there are at most 14 stored CABAC probability state sets, two slice types×seven slice QPs. Again, if a picture is lost, the states of the CABAC storages in the encoder and decoder may differ and the decoder may use an incorrect CABAC probability set.

Thus, there is a need for a technology of handling cross-picture data prediction in connection with encoding and decoding pictures of a video sequence.

SUMMARY

Is it a general objective to handle cross-picture data prediction in connection with encoding and decoding pictures of a video sequence.

This and other objectives are met by embodiments disclosed herein.

An aspect of the embodiments relates to a decoding method. The decoding method comprises storing sample data and non-sample data of a previously decoded picture of a video sequence in a decoder memory. The decoding method also comprises removing the sample data from the decoder memory while keeping the non-sample data in the decoder memory based on information retrieved from a bitstream constituting an encoded representation of the video sequence. The decoding method further comprises decoding a current picture of the video sequence based on the non-sample data stored in the decoder memory.

In another embodiment, the decoding method comprises storing sample data and non-sample data of a decoded picture of a video sequence in a decoded picture buffer (DPB). The decoding method also comprises marking the sample data in the DPB as one of used for reference and unused for reference and marking the non-sample data in the DPB as one of used for reference and unused for reference. Data marked as used for reference indicates that the data is available as reference data by a subsequently decoded picture of the video sequence and data marked as unused for reference indicates that the data is not available as reference data by any subsequently decoded picture of the video sequence. The decoding method also comprises removing the non-sample data from the DPB if the non-sample data is marked as unused for reference and removing the sample data from the DPB if the sample data is marked as unused for reference and the decoded picture is not needed for output. The decoding method further comprises decoding a current picture of the video sequence based on the sample data and/or the non-sample data stored in the DPB and marked as used for reference.

Another aspect of the embodiments relates to an encoding method. The encoding method comprises storing sample data and non-sample data of a previously encoded picture of a video sequence in an encoder memory. The encoding method also comprises removing the sample data from the encoder memory while keeping the non-sample data in the encoder memory based on information to be included in a bitstream constituting an encoded representation of the video sequence. The encoding method further comprises encoding a current picture of the video sequence based on the non-sample data stored in the encoder memory.

In another embodiment, the encoding method comprises storing sample data and non-sample data of an encoded picture of a video sequence in a DPB. The encoding method also comprises generating information defining marking the sample data in the DPB as one of used for reference and unused for reference and marking the non-sample data in the DPB as one of used for reference and unused for reference. Data marked as used for reference indicates that the data is available as reference data by a subsequently encoded picture of the video sequence and data marked as unused for reference indicates that the data is not available as reference data by any subsequently encoded picture of the video sequence. The encoding method also comprises removing the non-sample data from the DPB if the non-sample data is marked as unused for reference and removing the sample data from the DPB if the sample data is marked as unused for reference and the encoded picture is not needed for output. The encoding method further comprises encoding a current picture of the video sequence based on the sample data and/or the non-sample data stored in the DPB and marked as used for reference.

Further aspects of the embodiments relate to a decoder configured to store sample data and non-sample data of a previously decoded picture of a video sequence in a decoder memory. The decoder is also configured to remove the sample data from the decoder memory while keeping the non-sample data in the decoder memory based on information retrieved from a bitstream constituting an encoded representation of the video sequence. The decoder is further configured to decode a current picture of the video sequence based on the non-sample data stored in the decoder memory.

In another embodiment, the decoder is configured to store sample data and non-sample data of a decoded picture of a video sequence in a DPB. The decoder is also configured to mark the sample data in the DPB as one of used for reference and unused for reference and mark the non-sample data in the DPB as one of used for reference and unused for reference. Data marked as used for reference indicates that the data is available as reference data by a subsequently decoded picture of the video sequence and data marked as unused for reference indicates that the data is not available as reference data by any subsequently decoded picture of the video sequence. The decoder is further configured to remove the non-sample data from the DPB if the non-sample data is marked as unused for reference and remove the sample data from the DPB if the sample data is marked as unused for reference and the decoded picture is not needed for output. The decoder is additionally configured to decode a current picture of the video sequence based on the sample data and/or the non-sample data stored in the DPB and marked as used for reference.

Further aspects of the embodiments relate to an encoder configured to store sample data and non-sample data of a previously encoded picture of a video sequence in an encoder memory. The encoder is also configured to remove the sample data from the encoder memory while keeping the non-sample data in the encoder memory based on information to be included in a bitstream constituting an encoded representation of the video sequence. The encoder is further configured to encode a current picture of the video sequence based on the non-sample data stored in the encoder memory.

In an embodiment, the encoder is configured to store sample data and non-sample data of an encoded picture of a video sequence in a DPB. The encoder is also configured to generate information defining marking the sample data in the DPB as one of used for reference and unused for reference and marking the non-sample data in the DPB as one of used for reference and unused for reference. Data marked as used for reference indicates that the data is available as reference data by a subsequently encoded picture of the video sequence and data marked as unused for reference indicates that the data is not available as reference data by any subsequently encoded picture of the video sequence. The encoder is further configured to remove the non-sample data from the DPB if the non-sample data is marked as unused for reference and remove the sample data from the DPB if the sample data is marked as unused for reference and the encoded picture is not needed for output. The encoder is additionally configured to encode a current picture of the video sequence based on the sample data and/or the non-sample data stored in the DPB and marked as used for reference.

Aspects of the embodiments also relates to a computer program, and a carrier.

In an embodiment, the computer program comprises instructions, which when executed by at least one processor, cause the at least one processor to store sample data and non-sample data of a previously decoded picture of a video sequence in a memory. The at least one processor is also caused to remove the sample data from the memory while keeping the non-sample data in the memory based on information retrieved from a bitstream constituting an encoded representation of the video sequence. The at least one processor is further caused to decode a current picture of the video sequence based on the non-sample data stored in the memory.

In another embodiment, the computer program comprises instructions, which when executed by at least one processor, cause the at least one processor to store sample data and non-sample data of a decoded picture of a video sequence in a DPB in a memory. The at least one processor is also caused to mark the sample data in the DPB as one of used for reference and unused for reference and mark the non-sample data in the DPB as one of used for reference and unused for reference. Data marked as used for reference indicates that the data is available as reference data by a subsequently decoded picture of the video sequence and data marked as unused for reference indicates that the data is not available as reference data by any subsequently decoded picture of the video sequence. The at least one processor is further caused to remove the non-sample data from the DPB if the non-sample data is marked as unused for reference and remove the sample data from the DPB if the sample data is marked as unused for reference and the decoded picture is not needed for output. The at least one processor is additionally caused to decode a current picture of the video sequence based on the sample data and/or the non-sample data stored in the DPB and marked as used for reference.

In a further embodiment, the computer program comprises instructions, which when executed by at least one processor, cause the at least one processor to store sample data and non-sample data of a previously encoded picture of a video sequence in a memory. The at least one processor is also caused to remove the sample data from the memory while keeping the non-sample data in the memory based on information to be included in a bitstream constituting an encoded representation of the video sequence. The at least one processor is further caused to encode a current picture of the video sequence based on the non-sample data stored in the memory.

In yet another embodiment, the computer program comprises instructions, which when executed by at least one processor, cause the at least one processor to store sample data and non-sample data of an encoded picture of a video sequence in a DPB in a memory. The at least one processor is also caused to generate information defining marking the sample data in the DPB as one of used for reference and unused for reference and marking the non-sample data in the DPB as one of used for reference and unused for reference. Data marked as used for reference indicates that the data is available as reference data by a subsequently encoded picture of the video sequence and data marked as unused for reference indicates that the data is not available as reference data by any subsequently encoded picture of the video sequence. The at least one processor is further caused to remove the non-sample data from the DPB if the non-sample data is marked as unused for reference and remove the sample data from the DPB if the sample data is marked as unused for reference and the encoded picture is not needed for output. The at least one processor is additionally caused to encode a current picture of the video sequence based on the sample data and/or the non-sample data stored in the DPB and marked as used for reference.

The proposed technology also provides a carrier comprising a computer program according to above. The carrier is one of an electronic signal, an optical signal, an electromagnetic signal, a magnetic signal, an electric signal, a radio signal, a microwave signal, or a computer-readable storage medium.

According to the embodiments, data that is predicted across pictures in a video sequence is managed by separating the data into multiple data types, exemplified by sample data and non-sample data. Instead of keeping all data associated with a decoded picture in a DPB, data associated with a decoded picture is split by data type to enable storing of only a subset of all data associated with a decoded picture.

BRIEF DESCRIPTION OF THE DRAWINGS

The embodiments, together with further objects and advantages thereof, may best be understood by making reference to the following description taken together with the accompanying drawings, in which:

FIG. 6 illustrates a marking process according to a further embodiment;

FIG. 7 illustrates a marking process according to yet another embodiment;

FIG. 14 is a block diagram illustrating a decoder according to a further embodiment;

FIG. 15 is a block diagram illustrating an encoder according to a further embodiment;

FIG. 19 is a block diagram illustrating a decoder according to a further embodiment;

FIG. 20 is a block diagram illustrating an encoder according to a further embodiment;

FIG. 24 is a flow chart illustrating a decoding method according to an embodiment;

FIG. 25 is a flow chart illustrating additional, optional steps of the decoding method in FIG. 24 according to an embodiment;

FIG. 26 is a flow chart illustrating additional, optional steps of the decoding method in FIG. 24 and of the encoding method in FIG. 29 according to an embodiment;

FIG. 27 is a flow chart illustrating an additional, optional step of the decoding method in FIG. 24 and of the encoding method in FIG. 29 according to another embodiment;

FIG. 28 is a flow chart illustrating a decoding method according to another embodiment;

FIG. 29 is a flow chart illustrating an encoding method according to an embodiment.

DETAILED DESCRIPTION

Throughout the drawings, the same reference numbers are used for similar or corresponding elements.

The present embodiments generally relate to encoding and decoding pictures of a video sequence, and in particular to handling cross-picture data prediction in connection with encoding and decoding pictures.

Sample data as used herein comprises sample values, also denoted pixel values in the art, of samples, also denoted pixels in the art, in a picture of a video sequence. Such sample values are color component values.

Video coding uses various color spaces and formats to represent the colors of the pixels in the pictures of the video sequence. Non-limiting, but illustrative, examples of such color spaces or formats include red (R), green (G), blue (B) color, i.e., RGB color; luma (Y') and chroma (Cb, Cr) color, i.e., Y'CbCr color; luminance (Y) and chrominance (X, Z) color, i.e., XYZ color; luma or intensity (I) and chroma (Ct, Cp) color, i.e., ICtCp color. In such a case, a sample value as used herein could be any color component value, such as R, G, B, Y', Cb, Cr, X, Y, Z, I, Ct or Cp value. In a particular embodiment, a sample value is a luma value Y' or a chroma value Cb or Cr, more preferably a luma value Y'. Accordingly, sample data as used herein preferably comprises luma data Y' or chroma data Cb or Cr, more preferably luma data Y' of the samples in a picture, or a portion the samples in the picture.

Figure 1:
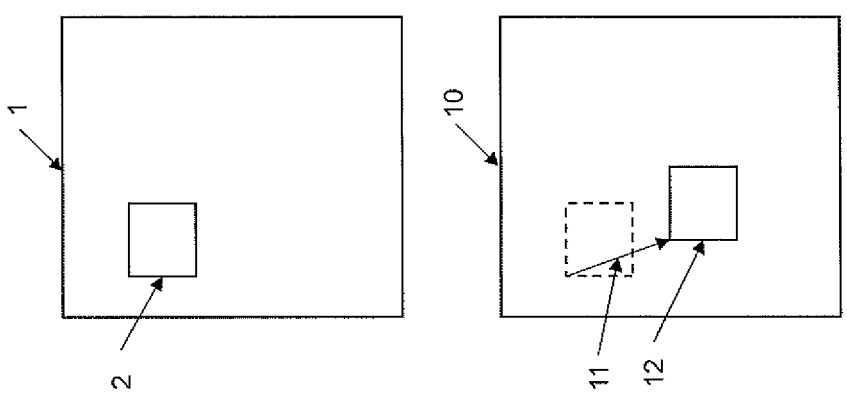
FIG. 1 schematically illustrates inter prediction between pictures of a video sequence.

Sample values of a sample block in a picture are predicted from either previously encoded or decoded sample values of the picture, in the case of intra (I) prediction, or from sample values in one or more prediction blocks belonging to previously encoded or decoded pictures, in the case of inter (P, B) prediction. The previously encoded or decoded pictures that are used for prediction are referred to as reference pictures. The location of the referenced prediction block 12 inside the reference picture 10 is indicated using a motion vector 11, see FIG. 1. Each motion vector 11 consists of x and y components, which correspond to the displacement between a current sample block 2 in the current picture 1 and the referenced prediction block 12 in the reference picture 10. In order to capture the displacement more accurately, the motion vectors could point to fractional sample positions in the reference picture 10.

Sample data thereby comprises sample values of prediction block(s) in reference picture(s). The reference picture(s), one reference picture and one prediction block in the case of uni-directional (P) inter prediction and two reference pictures and two prediction blocks in the case of bi-directional (B) inter prediction, is(are) stored in a decoded picture buffer (DPB), also referred to as decoder or encoder memory herein.

In addition to cross-prediction of sample data between pictures, the embodiments also refer to so-called non-sample data. Such non-sample data include decoding parameter values other than the sample data. Such non-sample data is, in the following embodiments, mainly exemplified by ALF parameter values or CABAC probability states. It is, though, to be understood that other types of decoding parameter values may be used in place of or in combination with ALF parameter values and/or CABAC probability states. Non-limiting, but illustrative, examples of types of non-sample data that can be predicted from a previously encoded or decoded picture according to the embodiments include CABAC probability states; ALF filter types; ALF parameters or coefficients; sample adaptive offset (SAO) parameters; coding tree structure parameters; interpolation filter coefficients; scaling matrices; slice_segment_address present in the slice header and specifying the address of the first coding tree block (CTB) in the slice segment, in coding tree block raster scan of a picture; slice_type present in the slice header and specifying the coding type of the slice, i.e., B, P or I slice; color_plane_id specifying the color plane associated with a slice; collocated_ref_idx present in the slice header and specifying the reference index of a collocated picture used for temporal motion vector prediction (TMVP); weighted prediction parameters, e.g., weights and/or offset used in weighted prediction or luma and chroma weights; merge candidate parameters, e.g., five_minus_max_merge_candidates; QP modification parameters, e.g., slice_qp_delta, slice_cb_qp_offset, slice_cr_qp_offset; deblocking parameters, e.g., slice_beta_offset_div2, slice_tc_offset_div2; entry point data, e.g., num_entry_point_offsets, offset_len_minus1, entry_point_offset_minus1; and slice header extension, e.g., slice_segment_header_extension_length, slice_segment_header_extension_data_byte.

Other non-sample data to predict from a previously encoded or decoded picture could be processed sample data, e.g., filtered data, subsampled data, etc.; intermediate sample data not used for output; residual data; or statistics drawn from the picture.

Non-sample data as used herein could include one decoding parameter, such as one of the decoding parameters listed above. Alternatively, the non-sample data including multiple, i.e., at least two, decoding parameters, such as two of the decoding parameters listed above.

According to the embodiments, data, typically denoted prediction data or reference data herein, that is predicted across pictures is managed in connection with decoding and encoding by separating the data stored in the DPB, or some other memory at the decoder and preferably at the encoder, into multiple data types. Thus, instead of keeping all data associated with a decoded picture, such as sample data and motion vector data used for temporal motion vector prediction, data associated with a decoded picture is split by type to enable storing only a subset of all data associated with a decoded picture.

In other words, prediction or reference data is split into multiple data types. In an embodiment, the prediction or reference data is split into two data types, the sample data and the non-sample data. In another embodiment, the prediction or reference data is split into M+1 data types, the sample data and M types of non-sample data, wherein M is an integer equal to or larger than two.

Note that in each embodiment below, calculating, determining or otherwise providing prediction data for a current picture based on prediction data from a previous picture may include:

1) Copy method—Copy prediction data as-is from a previously decoded or encoded picture.

For example, assume that a previously decoded picture P used ALF with a set of ALF parameter values. When decoding the slice header of a current picture C, the decoder determines which previously decoded picture to use as reference picture for ALF parameter prediction. The decoder then copies or uses the same ALF parameter values for picture C as were used for the reference picture P.

2) Prediction method—Use prediction data from a previously decoded or encoded picture as a prediction for the current picture and derive the final data values by using both the prediction data from a previously decoded or encoded picture and values signaled for the current picture.

For example, assume that a previously decoded picture P used ALF with a set of ALF parameter values. When decoding the slice header of a current picture C, the decoder determines which previously decoded picture to use as reference picture for ALF parameter prediction. For at least one ALF parameter in the set of ALF parameters, the decoder then decodes an ALF parameter delta value from the bitstream portion relating to the current picture C and combines this ALF parameter delta value with the corresponding ALF parameter value that was used in reference picture P. Preferably, the combination is done by addition of the ALF parameter delta value and the ALF parameter value from the reference picture P. In a preferred embodiment, this prediction method is used for multiple ALF parameter values.

3) Overwrite method—Partially overwrite prediction data values from a previously decoded or encoded picture by values signaled for the current picture.

For example, assume that a previously decoded picture P used ALF with a set of ALF parameter values. When decoding the slice header of a current picture C, the decoder determines which previously decoded picture to use as reference picture for ALF parameter prediction. For at least one ALF parameter in the set of ALF parameters, the decoder decodes an ALF parameter value from the bitstream portion relating to the current picture C and uses this ALF parameter value as is. For at least one other ALF parameter, the decoder uses either method 1) or 2) above.

Any combination of method 1, method 2 and method 3 can be used. For instance, method 1 and method 2 can be combined, in which some prediction data are copied and some prediction data are predicted.

Some of the embodiments below are described in the context of HEVC. A person skilled in the art would understand that HEVC may be replaced in the text with other existing or future video codecs, such as H.266, and/or extensions of HEVC.

Slice as used herein represent any partition of a picture. Slice can therefore indicate an independent slice segment, a dependent slice segment, tile, or any other partition of a picture.

Temporal layering is used herein as a layer example. A person skilled in the art should know that the methods described herein also would apply to other types of layers, such as e.g., spatial layers, Signal-to-Noise-Ratio (SNR) layers, and view layers.

The Decoded Picture Buffer (DPB) is used herein as the memory allocation structure for the picture data. It should be apparent to a person skilled in the art that the DPB may be replaced by other similar memory allocation structures. The DPB could also be named differently in a future video codec specification.

In an embodiment, non-sample data is stored separate from sample data in the DPB. Thus, in this embodiment, prediction data from a reference picture is separated into one type of sample data and at least one type of non-sample data. The prediction data as used herein is data that originates from when a reference picture was decoded and that may be used for prediction in the decoding process of a picture that is decoded after the reference picture. The prediction data is stored in a decoder memory, such as the DPB.

Non-exhaustive examples of prediction data are luma or chroma sample values, motion vectors, ALF filter coefficients and CABAC probability states as mentioned in the foregoing. With these examples, there are many ways of partitioning prediction data into data types.

One way is that the sample data type consists of luma or chroma sample values only while all other prediction data, i.e., motion vectors, ALF filter coefficients, and CABAC probability states in this example, is bundled into a single non-sample data type so that there are only two data types in total.

A second way is to bundle luma or chroma sample values and motion vector data and call that bundle sample data, while non-sample data consists of all other prediction data. This second way of bundling luma or chroma sample values and motion vector data may be preferred when Temporal Motion Vector Prediction (TMVP) is supported, such as the temporal direct mode in H.264/AVC and TMVP in H.265/HEVC.

Figure 2:
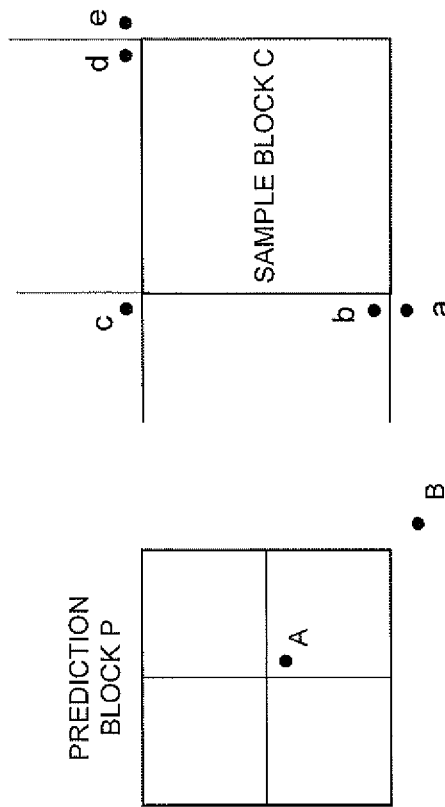
FIG. 2 schematically illustrates motion vector predictions in connection with temporal motion vector prediction.

TMVP extends the prediction of motion vectors to alternatively use motion vectors from previously decoded pictures for prediction. With reference to FIG. 2, the set of possible motion vector predictors for a current sample block C includes five previously decoded motion vectors from the same picture as the current picture, which are illustrated by the spatial positions a-e in FIG. 2. The set of possible predictors also includes two possible motion vectors from a previously decoded prediction block P of a reference picture, which are illustrated by the positions A and B in FIG. 2. In case there are several reference pictures used for the current picture, the picture to select is signaled in the HEVC bitstream using the collocated_ref_idx code word. The value of this code word is used as an index in a reference picture list. In case of a uni-predicted slice, i.e., slice_type equal to P, the index is used with the final L0 reference picture list. In case of a bi-predicted slice, i.e., slice_type equal to B, there is an additional code word collocated_from_l0_flag that specifies whether collocated_ref_idx applies to the final L0 reference picture list or the final L1 reference picture list. The result of these code words is a single picture that will be used as the co-located picture for the slice. All TMVP motion vectors for the slice will come from this co-located picture.

A third way is to let sample data consist of luma or chroma sample values and motion vectors as in the second way, while all other data has got their own separate non-sample data types. In the example above there would then be one non-sample data type for ALF filter coefficients and another separate non-sample data type for CABAC probability states.

All prediction data may be associated with a picture, typically referred to as reference picture, through a picture identifier. Two well-known example picture identifiers are frame_num used in H.264/Advanced Video Coding (AVC) and Picture Order Count (POC) used in H.265/HEVC. These picture identifiers are directly associated with the reference picture and the identifier values are persistent. An alternative method is to associate prediction data with logical slots in memory, where the prediction data is not necessarily persistently associated with a particular slot but the association can change over time. This means that the identifier value for a particular piece of data may change over time. An example of this is a FIFO queue where new data logically moves existing data one step down in the FIFO queue and therefore changes the slot content and thereby the identifier value of the data that was logically moved. Another example would be explicit reordering of data or reassignments of identifiers. Herein, picture identifier is used to denote any identifier resulting from any association of prediction data with identifier values such that the prediction data can be uniquely identified for memory management, regardless of whether the prediction data is of the same type or not. It is preferred to use identifiers that are directly associated with reference pictures, such as POC.

The decoder is instructed by elements in the bitstream, or by other means, when to free memory of a certain data type with a certain picture identifier value. This means that at a particular point in the decoding process, only a subset of all data types associated with one particular reference picture may be present in decoder memory, such as the DPB. For instance, non-sample data of type T with picture identifier value R may be present in the decoder memory and available for reference when decoding a current picture, but neither non-sample data of type Y with identifier value R nor sample data of type S with identifier value R are available in the decoder memory since the decoder has previously been instructed, such as by elements in the bitstream, to free data of types Y and S with identifier value R.

The following decoding steps illustrate decoder operations for this embodiment for the case where sample data of a particular reference picture is freed while non-sample data is kept.

1. A first picture, referred to as previously decoded picture (P), is decoded by the decoder and sample data (S) and non-sample data (N) of type (T) for the previously decoded picture (P) is stored in the decoder memory. Thus, the previously decoded picture (P) is available as reference picture in the decoder memory.

2. The decoder is instructed by elements in the bitstream, or by other means, to free the decoder memory used for storing the sample data (S) for the previously decoded picture (P) while the non-sample data (N) of type (T) for the previously decoded picture (P) is kept in the decoder memory.

3. The decoder frees the decoder memory used for storing the sample data (S), such that the sample data (S) is no longer present in the decoder memory. This means that the sample data (S) is not available as prediction data when decoding a current picture (C), whereas the non-sample data (N) of type (T) is available in the decoder memory as prediction data for the current picture (C).

4. The decoder decodes the current picture (C) by using non-sample data (N) of type (T) decoded for the previously decoded picture (P) as prediction data.

The following encoding steps illustrate encoder operations for this embodiment for the case sample data of a particular reference picture is freed while non-sample data is kept.

1. A first picture, referred to as previously encoded picture (P), is encoded by the encoder and sample (S) and non-sample (N) data of type (T) for the previously encoded picture (P) is stored in the encoder memory. The encoder outputs a coded picture. Both the stored sample (S) and the non-sample (N) data consists of values that will be derived by a decoder decoding the output coded picture.

2. The encoder decides or is instructed to free the encoder memory used for storing the sample data (S) for the previously encoded picture (P) while the non-sample data (N) of type (T) for the previously encoded picture (P) is kept in the encoder memory. The encoder outputs coded instructions that will instruct a decoder that decodes the coded instructions to free a decoder memory used for storing the sample data (S) for the previously encoded picture (P).

3. The encoder frees the encoder memory used for storing the sample data (S) for the previously encoded picture (P), such that the sample data (S) is no longer present in the encoder memory 4. The encoder encodes a current picture (C) by using non-sample data (N) of type (T) for the previously encoded picture (P). The non-sample data (N) may be used for prediction when encoding the current picture (C).

In an embodiment, non-sample data is signaled using a list. Thus, a list of indicators or indices to non-sample data from previously encoded or decoded pictures is generated. The list of indicators may be a list of picture identifiers. The indicator or index of non-sample data in the list of indicators to use for coding or decoding the current picture is signaled in the bitstream to the decoder so that the decoder will know what non-sample data to use for decoding the current picture.

The following decoder steps illustrate the actions the decoder would make for the current embodiment.

1) Non-sample data from multiple previously decoded pictures, i.e., reference pictures, is present in the decoder memory. In an embodiment, at least one previously decoded picture for which sample data is also present in the decoder memory and at least one previously decoded picture for which sample data is not present in the decoder memory.

2) The decoder generates a list of indicators to the non-sample data from the previously decoded pictures stored in the decoder memory.

3) The decoder decodes one or more code word from the bitstream and uses the decoded value of the at least one code word as an index in the list to identify which non-sample data that will be used for decoding a current picture.

4) The decoder decodes the current picture using the non-sample data identified by the code word and the list.

The following encoder steps illustrate the actions the encoder would make for the current embodiment.

1) Non-sample data from multiple previously encoded pictures is present in the encoder memory. In an embodiment, at least one previously encoded picture for which sample data is also present in the encoder memory and at least one previously encoded picture for which sample data is not present in the encoder memory.

2) The encoder generates a list of indicators to different non-sample data from the multiple previously encoded pictures stored in the encoder memory.

3) The encoder selects a non-sample data from the list of indicators.

4) The encoder encodes one or more code words into the bitstream with the index value into the list to identify the selected non-sample data that will be used for encoding and decoding of a current picture.

5) The encoder encodes the current picture using the selected non-sample data.

The list of indicators could consist of picture identifiers, such as POC used in H.265/HEVC or frame_num used in H.264/AVC, or logical slots as described in the foregoing.

The following example illustrates how the list of picture indicators could look like when it is based on POC numbers, Table 1 shows the available sample data and non-sample data when decoding the picture with POC 7 from the bitstream when a random access configuration with different layers, such as e.g., temporal layers, is used. An 'X' means that the data is available while a '−' means that the data is not available.

TABLE 1

Example of list of picture identifiers

| POC | Layer Id | Sample data | Non-sample data |
|-----|----------|-------------|-----------------|
| 0   | 0        | X           | X               |
| 16  | 0        | X           | X               |
| 8   | 1        | X           | X               |
| 4   | 2        | X           | X               |
| 2   | 3        | —           | X               |
| 1   | 4        | —           | X               |
| 3   | 4        | —           | X               |
| 6   | 3        | X           | X               |
| 5   | 4        | —           | X               |
| 7   | 4        |             |                 |

The decoder memory, such as DPB, would, thus, when decoding the picture with POC 7, hold sample data for which the sample data list indicators point to, i.e., POCs 0, 16, 8, 4 and 6. The decoder memory would also, when decoding POC 7, contain non-sample data for which the non-sample data list indicators point to, i.e., POCs 0, 16, 8, 4, 2, 1, 3, 6 and 5. When decoding the picture with POC 7, which in this example is in the highest temporal layer of the bitstream, layer 4, it is fine to have list indicators to all previously decoded non-sample data and still preserve temporal scalability. When decoding a picture of a lower layer, e.g., the picture with POC 10 at layer 3, then list indicators to non-sample data from pictures of layers that are only lower or equal to the current layer Id could be in the list, if layer scalability is to be preserved. Table 2 below illustrates POC sample data list indicators for the available sample data as in the JVET Common Test Conditions (CTC) and the POC non-sample data list indicators for the additional available non-sample data. Here 'X' means that the data is available for prediction of the current picture with POC=10 and a '−' means that the data is not available for prediction of the current picture with POC=10.

TABLE 2

Example of list of picture identifiers

| POC | Layer Id | Sample data | Non-sample data |
|-----|----------|-------------|-----------------|
| 0   | 0        | X           | X               |
| 16  | 0        | X           | X               |
| 8   | 1        | X           | X               |
| 4   | 2        | —           | X               |
| 2   | 3        | —           | X               |
| 1   | 4        | —           | —               |
| 3   | 4        | —           | —               |
| 6   | 3        | —           | X               |
| 5   | 4        | —           | —               |
| 7   | 4        | —           | —               |
| 12  | 2        | X           | X               |
| 10  | 3        |             |                 |

In an embodiment, Reference Picture Set (RPS) is used to manage the DPB memory. RPS is a concept in HEVC that defines how previously decoded pictures are managed in a DPB in order to be used for reference, i.e., sample data prediction and motion vector prediction. In other words, which decoded pictures to store in the DPB is in HEVC signaled using RPS. An RPS is a set of indicators to previously decoded pictures. An RPS is signaled in each slice header in HEVC. All pictures in the DPB that are not included in the RPS are marked as "unused for reference", sometimes denoted "unused for prediction". Once a picture has been marked as unused for reference it can no longer be used for prediction, and when it is no longer needed for output it will be removed from the DPB. If a picture in the RPS is set to "used by curr pic" it means the picture may be used as a reference picture for the current picture. If not, the picture is kept in the DPB, since it is included in the RPS, but cannot be used for prediction for the current picture.

HEVC uses at most two reference picture lists, L0 and L1 for each picture. P-pictures uses L0 and B-pictures uses L0 and L1. The reference picture lists are constructed from the RPS subsets RefPicSetStCurrBefore, RefPicSetStCurrAfter and RefPicSetLtCurr.

In an embodiment, encoder instructions to free or keep certain data in the decoder memory are conveyed to the decoder through syntax elements in the bitstream. Table 3 below shows all the type combinations that can be stored in the decoder memory for data originating from a single picture given two data types. The first type in this example is "Sample data" that may or may not contain motion vector data in addition to luma and chroma sample values. The second type is "Non-sample data", which in this example consists of both ALF and CABAC data that could be used for prediction when decoding future pictures. A 'X' means that the data is stored and present in memory and a means that the data is not stored nor present in memory.

TABLE 3

Type combinations of stored data

| Sample data | Non-sample data (ALF and CABAC) | Description |
|-------------|--------------------------------|-------------|
| —           | —                              | Nothing stored in memory |
| —           | X                              | Non-sample data only stored in memory |

TABLE 3-continued

Type combinations of stored data

| Sample data | Non-sample data (ALF and CABAC) | Description |
|---|---|---|
| X | — | Sample data only stored in memory |
| X | X | Both stored in memory |

A second example with three types is shown in Table 4 below. Here the sample data type is as in the first example. Then there is both non-sample data type 1 and 2 for CABAC and ALF data respectively. Table 4 shows all possible combinations.

TABLE 4

Type combinations of stored data

| Sample data | Non-sample data type 1 (CABAC) | Non-sample data type 2 (ALF) |
|---|---|---|
| — | — | — |
| — | — | X |
| — | X | — |
| — | X | X |
| X | — | — |
| X | — | X |
| X | X | — |
| X | X | X |

Note that both these examples only show the possible combinations for sample data and non-sample data originating from one particular reference picture. In practice, the decoder will store sample data and non-sample data originating from multiple reference pictures, keeping different parts from different reference pictures. Table 5 below shows an example of what the decoder memory may look like at a particular point in the decoding process. An 'X' means that the data is stored and a '−' means that the data is not stored. The decoder in this example has decoded eight previous pictures, each represented by a row in Table 5. For each previously decoded picture, Table 5 shows what is currently stored in the decoder memory. For example, for the second decoded picture (the picture with "Reference picture POC" equal to 1), only ALF data originating from this picture is currently stored. Sample data and CABAC data is not stored. It can be assumed that that the sample data and CABAC data have been stored but are now freed.

TABLE 5

Type combinations of stored data

| Reference picture POC | Sample data | Non-sample data type 1 (CABAC) | Non-sample data type 2 (ALF) |
|---|---|---|---|
| 0 | — | — | — |
| 1 | — | — | X |
| 2 | X | X | X |
| 3 | — | — | — |
| 4 | — | — | X |
| 5 | — | X | — |
| 6 | X | X | X |
| 7 | X | X | X |

It should be noted that transitions from one combination to another is only possible where there is no data type for which a '−' changes to a 'X' since data that has been freed cannot be retrieved again. For example, in Table 3 it is not possible to go from "Sample data only stored in memory" to "Both stored in memory".

In a particular example, there are only two data types and the combination "Sample data only stored in memory" is not supported. The reason for this is that it can be assumed that the storage space needed for the sample data is so much larger than the storage space required for the non-sample data so that the added memory needed for the non-sample data, given that the corresponding sample data is stored, is negligible. The example uses the RPS concept and the three combinations are signaled by adding one type flag to the RPS, see Table 6.

TABLE 6

RPS signaling

| Sample data | Non-sample data | Description | Signaling |
|---|---|---|---|
| — | — | Nothing stored in memory | Syntax elements not present in the RPS |
| — | X | Only non-sample data stored in memory | Type flag set to one particular value, e.g. "0" |
| X | X | Sample and non-sample data stored in memory | Type flag set to one particular value, e.g. "1" |

New code words are added to the RPS where RPS pictures are listed. This is preferably done in slice header syntax and possibly as well as parameter set syntax where RPS may be signaled. The code words are preferably added next to the used_by_curr_pic_lt_flag[i], used_by_curr_pic_flag[j], used_by_curr_pic_s0_flag[i], used_by_curr_pic_s1_flag[i] code words. Given the example above, the new code words are flags as illustrated in Table 6. One value '0' means that only non-sample data of the reference picture is stored in the decoder memory, such as DPB. The other value '1' means that both sample and non-sample data are stored. When signaled in the slice header, the values should be kept the same for all slices of the same picture.

In a more advanced embodiment with more data types, the code words may be longer than a flag to distinguish between several types. In Table 7, the code word may be three bits long in order to enable signaling of eight different possibilities using the shown possible code word. Table 8 illustrates an alternative with a Variable Length Coding (VLC) code word. Note that a code word for the first row in Table 7 and Table 8 is not needed since the indication to not store any data is done by not referencing the reference picture at all in the RPS. Note also that the possible code word in Table 7 can be seen as three flags where each flag corresponds to whether data of the data type is stored (1) or not (0). Possible data types could include CABAC probability states, ALF parameters, motion vectors, etc.

TABLE 7

RPS signaling

| Sample data | Non-sample data type 1 (CABAC) | Non-sample data type 2 (ALF) | Code word |
|---|---|---|---|
| — | — | — | n/a |
| — | — | X | 001 |
| — | X | — | 010 |
| — | X | X | 011 |
| X | — | — | 100 |
| X | — | X | 101 |
| X | X | — | 110 |
| X | X | X | 111 |

TABLE 8

RPS signaling with VLC

| Sample data | Non-sample data type 1 (CABAC) | Non-sample data type 2 (ALF) | Code word |
|---|---|---|---|
| — | — | — | n/a |
| — | — | X | 00111 |
| — | X | — | 00110 |
| — | X | X | 00101 |
| X | — | — | 00100 |
| X | — | X | 011 |
| X | X | — | 010 |
| X | X | X | 1 |

For each picture identifier in the RPS, the data type is stored. In the example of only two data types, the types may be named "all data" or "only non-sample data".

In the derivation process for reference picture sets, the five RPS lists RefPicSetStCurrBefore, RefPicSetStCurrAfter, RefPicSetStFoll, RefPicSetLtCurr and RefPicSetLtFoll are preferably modified to not only keep reference pictures, but optionally keep only some prediction data types for a particular reference picture.

The following Table 9 shows what the decoder does for the example of two data types. Here, S represents sample data and N represents non-sample data. The fifth row of Table 9 shows that if the decoder memory contains both sample data and non-sample data and the type indication is "only non-sample data", then the sample data is marked "unused for reference", while the non-sample data is kept. The three last rows show the regular RPS mechanism that data belonging to picture identifiers that is not present in the RPS is removed. Although not shown in Table 9, sample data that is not present in the column "Memory after" is preferably marked "unused for reference", while non-sample data that is not present in the column "Memory after" is preferably removed from the decoder memory as part of the decoding process of the current picture.

TABLE 9 decoder memory processing

| Memory before | Type indication | Memory after |
|---|---|---|
| S + N | "all data" | S + N |
| N | "all data" | forbidden |
| — | "all data" | forbidden |
| S + N | "only non-sample data" | N |
| N | "only non-sample data" | N |
| — | "only non-sample data" | forbidden |
| S + N | Not listed in RPS | — |
| N | Not listed in RPS | — |
| — | Not listed in RPS | — |

As shown in Table 9, prediction data of data types that is indicated must be present in the decoder memory. It is preferably forbidden to indicate data that is not present there. Table 9 also shows that type indication is used to remove data from the decoder memory. This concept can be extended for more complicated data types, such as the example with three data types in Table 7 and Table 8. Also with three data types, data indicated must be present in the decoder memory. If there are more data types in the decoder memory than what is indicated, the prediction data that is not indicated is removed from the decoder memory, for non-sample data, or marked as "unused for reference", for sample data.

To summarize:

Prediction data that is indicated must be present in the decoder memory and is kept in the decoder memory.

Prediction data that is present in the decoder memory and not indicated is removed from the decoder memory, for non-sample data, or marked as "unused for reference", for sample data.

Marking as short-term and long-term is preferably done according to the regular RPS mechanisms.

The DPB is used to store all prediction data but in addition to the DPB fullness counter there are preferably new counters for each new prediction data type. The DPB is emptied and counters are set to 0 when the decoder is initialized and/or when an IRAP picture is encountered. After a current picture has been decoded, all of its prediction data is stored in the DPB and all counters are incremented by one. All prediction data is then preferably marked "used for short-term reference". Removal of non-sample data of type T from the DPB is done during the decoding process for RPSs when the corresponding prediction data is not referenced by the RPS, either because the corresponding picture identifier is not listed in the RPS, or because the type indication in the RPS does not include prediction data of type T. At removal of non-sample data of type T, the DPB data counter for type T is preferably decremented by one.

In an embodiment, non-sample data is copied to make it remain longer in the DPB. Thus, in this embodiment, the non-sample data from a decoded picture in the DPB is copied to, for instance, the current picture. This is preferably done for a previously decoded picture that is going to be removed from the DPB. By doing so, the specific non-sample data could stay longer in the DPB. The indication to copy the non-sample data and the indicator of the picture to copy the non-sample data from could be signaled in the bitstream. Alternatively, the indication to copy the non-sample data and the indicator to the picture to copy the non-sample data from, could be derived from prior knowledge of the DPB picture bumping procedure.

In an alternative embodiment, the non-sample data from the previously decoded picture in the DPB is not copied to the current picture, but to another previously decoded picture in the DPB. This could be useful in case the current picture already has valid non-sample data but the other previously decoded picture in the DPB does not. The indicator for the previously decoded picture to copy to could then be signaled in the bitstream or be derived from prior knowledge of the DPB picture bumping procedure. In a particular embodiment, the non-sample data is copied to the previously decoded picture that will remain the longest in the DPB, optionally a previously decoded picture for which there is no valid non-sample data.

The decoder behavior for the embodiment is illustrated below.

1. Receive, or derive, indication of removing picture (P) from the DPB.
2. Receive, or derive, indication of copying non-sample data (N) from picture (P) to the current picture or another previously decoded picture in the DPB.
3. Copy non-sample data (N) from picture (P) to the current picture or the other previously decoded picture in the DPB.
4. Remove picture P from the DPB The encoder behavior for the current embodiment is illustrated below.

1. Determine, and potentially signal in the bitstream, a picture (P) to be removed from the DPB.

2. Determine, and potentially signal indication in the bitstream, to copy non-sample data (N) from picture (P) to the current picture or another picture in the DPB.
3. Copy non-sample data (N) from picture (P) to the current picture or the other picture in the DPB.
4. Remove picture (P) from the DPB.

Note, all steps 1-4 at the decoder or encoder do not need to be executed for a current picture. For instance, it is possible to copy non-sample data from a picture that will be removed further into the future. This could be the case when the current picture does not have any valid non-sample data, but there are no pictures in the DPB that is currently going to be removed. Copying non-sample data to the current picture from one of the previously decoded pictures in the DPB may then be preferred.

The embodiment can be exemplified for the low delay configuration of the JVET CTC where the non-sample data are the ALF parameter values. The RPS for low delay in the CTC is illustrated by Table 10 below. Each row shows the state for one picture. Picture number is in this example just a numbering of pictures that will increase by 1 for each decoded picture. For example, assume that we have decoded 100 pictures and that the picture number is equal to 100. This means that picture number % 4 is equal to 0. Slot 1-4 will therefore keep data from picture numbers 99, 95, 91 and 87, respectively. For the next picture with picture number equal to 101, data from picture numbers 100, 99, 95, 91 will be kept. All slots here store all prediction data.

TABLE 10

RPS for low delay configuration

| Picture number % 4 | Slot 1 | Slot 2 | Slot 3 | Slot 4 |
|---|---|---|---|---|
| 0 | −1 | −5 | −9 | −13 |
| 1 | −1 | −2 | −6 | −10 |
| 2 | −1 | −3 | −7 | −11 |
| 3 | −1 | −4 | −8 | −12 |

An alternative would be to add three more slots, slot 5-7, and use them to only store ALF parameter values and no sample data. This would be signaled with RPS in, for instance, the Sequence Parameter Set (SPS), where slots 1-4 are as before and stores both sample data and non-sample data. Thus, slots 1-4 store all prediction data, i.e., sample data and non-sample data, while slots 5-7 store only non-sample data.

TABLE 11

RPS for low delay configuration

| Picture number % 4 | Slot 1 | Slot 2 | Slot 3 | Slot 4 | Slot 5 | Slot 6 | Slot 7 |
|---|---|---|---|---|---|---|---|
| 0 | −1 | −5 | −9 | −13 | −2 | −3 | −17 |
| 1 | −1 | −2 | −6 | −10 | −3 | −14 | −18 |
| 2 | −1 | −3 | −7 | −11 | −2 | −15 | −19 |
| 3 | −1 | −4 | −8 | −12 | −2 | −3 | −16 |

This could be combined with data copying that in the decoder would work as follows in an embodiment.

In the slice header of the picture there is a new flag, preferably gated by SPS or Picture Parameter Set (PPS), whether non-sample data copy from a picture in the RPS should be done or not. If that flag is 0, nothing extra is done. If that flag is 1, an index follows in the bitstream. The decoder then decodes the picture. After decoding, an array containing POCs for which there is non-sample data in the DPB and used_by_curr_pic is equal to 1 is constructed. Note that there may be POC values for which there is no sample data in the DPB, such as in slot 5-7 in Table 11. The index is used with that list to indicate what non-sample data to copy. The non-sample data is preferably always copied to the current picture. Alternatively, there could be two indices, one for copying from, i.e., indicating from which reference picture in the DPB to copy the non-sample data from, and one for copying to, i.e., indicating to which reference picture in the DPB to copy the non-sample data to.

In an example, the encoder would signal the RPSs in the SPS that specifies slots 1-7 above. When there is unique non-sample data in any of the slots 5-7 and no explicit ALF parameter values, i.e., non-sample data, are used in the current picture, the encoder decides to do a copy of the non-sample data from the slot to the current picture after the current picture has been decoded. The encoder signals to the decoder to do the same, preferably by setting the flag to 1, constructing a list of picture identifiers, such as POC values, for which there is non-sample data in the DPB and used_by_curr_pic is equal to 1, calculating what index value in the list that corresponds to the non-sample data to copy and signals that index to the decoder in the bitstream. If there is no unique non-sample data in slots 5-7 and the encoder realizes that the non-sample data will leave any of slot 1-4 at the next picture, the encoder may check whether explicit ALF parameter values are used for the current picture. If so, the encoder does nothing and the non-sample data will be stored in slot 5-7. If no explicit ALF parameter values are used for the current picture, the encoder adds syntax elements so that the non-sample data will be copied to the current picture after it has been encoded. If no copy is planned and there is ALF parameter values in any of the slots 5-7, the encoder may copy those ALF parameter values to the current picture.

As an example, given that eight possible indexes are used, indexing to a list of size 8 costs 4 bits, so 5 bits per picture would be the worst case here if the encoder always copies. The worst case low delay sequence in CTC averages 1833 bits and would have an average bit cost of 62 bits per picture, i.e., 3.382% signaling overhead, using an approach with long-term pictures. Here, the cost would be 5/1833=0.27%. In practice, this number is much lower since copy is not done for every picture.

In another embodiment, the positions of the non-sample data are updated in a given order when a new picture is decoded. The non-sample data is, for instance, ordered by how likely it is to be used, such as based on logic, statistics or heuristics, and attached to the decoded pictures in the DPB and the current picture such that the non-sample data that is least likely to be used would be attached to the picture that would be removed first from the DPB. An example of a logical ordering is to order by slice type, temporal layer or slice QP of the picture where they were first used. The non-sample data could also be ordered by how much gain they are expected to give for future pictures.

In yet another embodiment, the copy-to-position for the non-sample data does not necessarily need to be empty as long as the non-sample data to be copied to the position is more likely to give better results than the non-sample data that will be overwritten. One specific example of this is if the non-sample data in two slots in the DPB are identical, one of them may be overwritten.

In an embodiment, after the non-sample data has been copied to the current picture, or to any of the other decoded pictures in the DPB, a marker is preferably added to that picture that non-sample data for that picture is not associated with the sample data of that picture. This could be useful, for example, when storing motion vector data in an intra picture. The encoder and decoder would then know that it is valid to use motion vectors from the intra picture.

Figure 3:
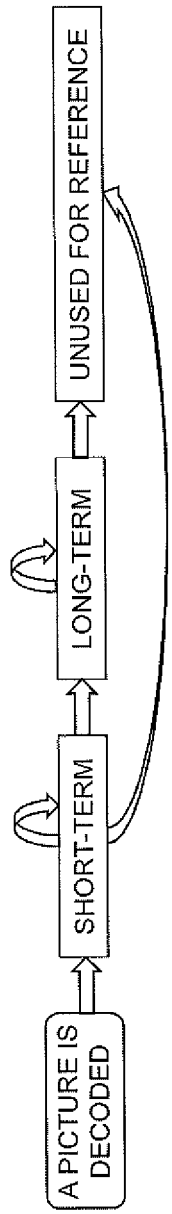
FIG. 3 illustrates the picture marking process in HEVC.

HEVC allows, as a part of the picture marking process, the transitions between states as shown in FIG. 3. When a picture has been decoded it is marked as a short-term picture. A short-term picture can then be marked as a short-term picture, as a long-term picture or as unused for reference. A long-term picture can be marked as a long-term picture or as unused for reference. A picture that was marked as unused for reference must remain unused for reference. The transitions of states are illustrated in FIG. 3.

In this embodiment, an extended marking process for the pictures in the DPB, compared to HEVC, is introduced in order to handle separation of data types, e.g., sample data and non-sample data, in the DPB. Memory is managed and freed through a marking process where stored prediction data for a decoded picture is separated into at least two data types where data (D) of a particular type for a particular picture is marked separately. Data (D) can be marked as "used for short-term reference", "used for long-term reference" or "unused for reference".

For all data of a picture, the marking is either:
All prediction data is short-term
All prediction data is long-term
Some prediction data is short-term and some prediction data is unused for reference
Some prediction data is long-term and some prediction data is unused for reference
All prediction data is unused for reference During the marking process of the prediction data for a picture the following rules preferably apply:
Prediction data marked as short-term may be marked as long-term
Prediction data marked as either short-term or long-term may be marked as unused for reference
No prediction data marked as long-term can be marked as short-term
No prediction data previously marked as unused for reference may be marked as short-term or long-term Conversion from short-term to long-term marking can be done according to the regular RPS mechanism. However, no mix of short-term and long-term marking for prediction data of the same picture identifier is preferably allowed as shown in Table 12 below where T1 and T2 denote two different data types, such as sample data and non-sample data. Unused in Table 12 represent marked as "unused for reference" in case the data type hold sample data. In case the data type does not hold sample data, unused indicates that the prediction data shall be removed from the DPB. Ok in Table 12 indicates that the marking combination is allowed, whereas forbidden indicates that the marking combination is not allowed.

TABLE 12

| marking of prediction data | | |
|---|---|---|
| T1 | T2 | |
| Short-term | Short-term | Ok |
| Short-term | Long-term | Forbidden |
| Short-term | Unused | Ok |
| Long-term | Short-term | Forbidden |
| Long-term | Long-term | Ok |
| Long-term | Unused | Ok |
| Unused | Short-term | Ok |

TABLE 12-continued

| marking of prediction data | | |
|---|---|---|
| T1 | T2 | |
| Unused | Long-term | Ok |
| Unused | Unused | Ok |

Figure 4:
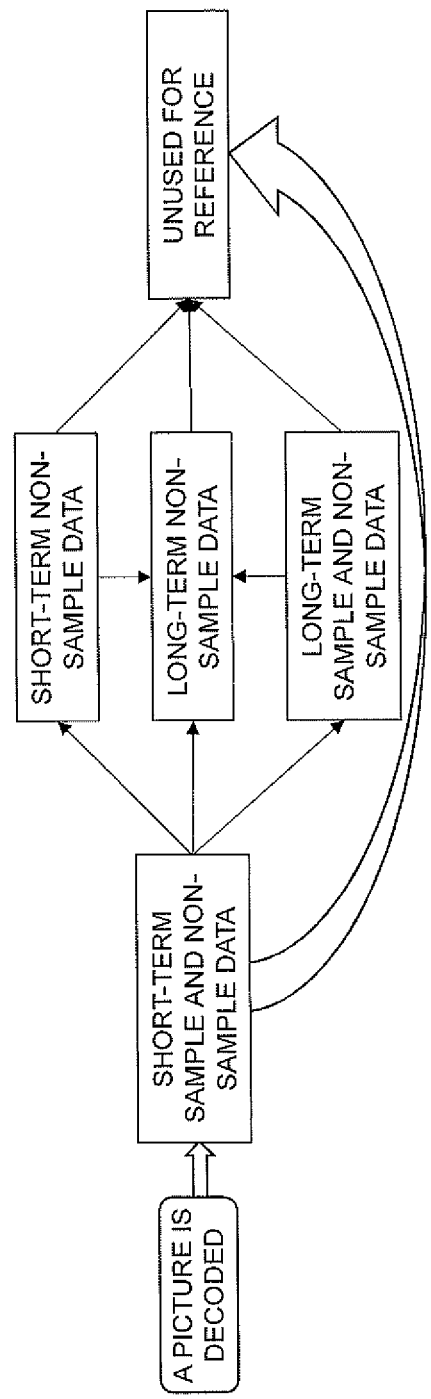
FIG. 4 illustrates a marking process according to an embodiment.

In an embodiment, prediction data of a reference picture is separated into sample data and non-sample data where the data types are marked individually in the marking process according to the rules in Table 12, with the addition that sample data may not be marked short-term or long-term unless non-sample data is marked short-term or long-term. The transition state diagram is illustrated in FIG. 4. When a picture has been decoded it is marked as short-term picture with sample data (S) and non-sample data (N), or short-term S+N for short. A short-term S+N can be marked as short-term S+N, as short-term N, as long-term S+N, as long-term N or as unused for reference. A short-term N could be marked as short-term N, as long-term N or as unused for reference. A long-term S+N could be marked as long-term S+N, as long-term N or as unused for reference. A long-term N could be marked as long-term N or as unused for reference. Although not shown in FIG. 4, to simplify the figure, all markings except unused for reference could go to themselves.

Figure 5:
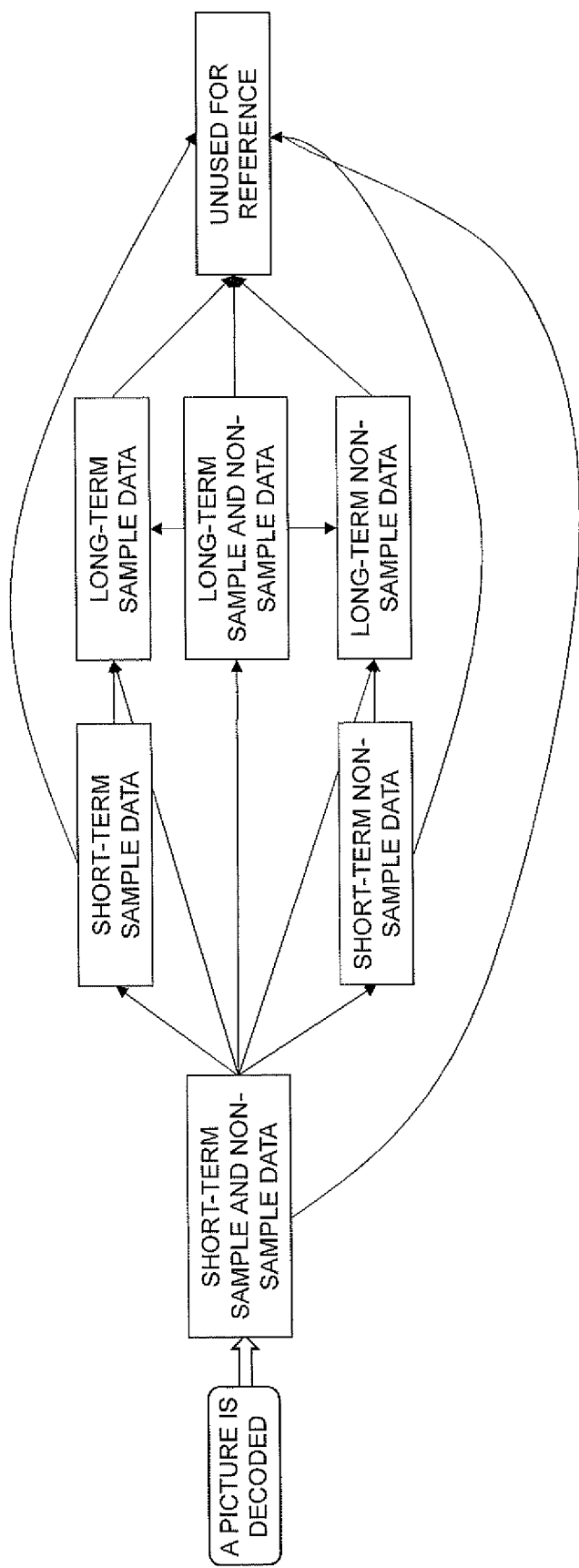
FIG. 5 illustrates a marking process according to another embodiment.

In another embodiment, the prediction data of a reference picture is also separated into sample data and non-sample data where the data types are marked individually in the marking process according to the rules in Table 12, with marking for sample data and non-sample data set individually. The transition states are illustrated in FIG. 5. When a picture has been decoded it is marked as a short-term picture with sample data (S) and non-sample data (N), or short-term S+N for short. A short-term S+N could be marked as a short-term S+N, as short-term S, as short-term N, as long-term S, as long-term N, as long-term S+N or as unused for reference. A short-term S could be marked as short-term S, as long-term S or as unused for reference. A short-term N could be marked as short-term N, as long-term N or as unused for reference. A long-term S could be marked as long-term S or as unused for reference. A long-term N could be marked as long-term N or as unused for reference. A long-term S+N could be marked as long-term S+N, as long-term S, as long-term N or as unused for reference. Prediction data marked as unused for reference must remain unused for reference. Although not shown in FIG. 5, to simplify the figure, all markings except unused for reference could go to themselves.

Sample data is preferably removed from the DPB when the associated picture is marked as "not needed for output" and sample data is marked as "unused for reference". Non-sample data is preferably removed from the DPB when it is marked as "unused for reference". In another embodiment, the "unused for reference" marking is not used for the non-sample data, instead the non-sample data is directly removed from the DPB when it becomes unused for reference. This is illustrated in FIG. 6. Note that only five combinations are allowed:
All prediction data is short-term
All prediction data is long-term
Some prediction data is short-term and some prediction data is unused for reference
Some prediction data is long-term and some prediction data is unused for reference
All prediction data is unused for reference This means that a mix of short-term and long-term data from one picture is not allowed in this embodiment.

In yet another embodiment, more than two data types may be used in the marking process, for example sample data, non-sample ALF data and non-sample CABAC data. In this case, the marking could be made individually following the rule of the five combinations above. A generalized version of this embodiment is illustrated in FIG. 7 for the case of M different non-sample data types.

The term "marking" has been used herein when describing the state of the data. This term may be used interchangeably with the terms "indication", "selection" or "tagging".

The maxDPBSize property value in HEVC specifies the maximum number of reference pictures that may be stored in the DPB for HEVC. This value ranges between 6 and 16 depending on level and picture size. In practice, maxDPBSize in combination with the number of samples per picture sets the memory requirements of the DPB for the decoder.

In an embodiment, the maximum memory usage of the DPB is specified as the total memory used for all prediction data, i.e., sample data and non-sample data in the DPB, i.e., the sample data of the reference pictures and the non-sample data of the reference pictures share a joint memory pool.

As an example, a bitstream with resolution 1920×1080 and 4:2:0 chroma subsampling is decoded using temporal prediction of non-sample data where the bit size of the non-sample data for a picture is 1 Mbit. Then having six pictures with both sample data and non-sample data in the DPB results in 1920×1080×12×6+1000000×6=155299200 bits, which is equivalent in memory consumption to having five pictures with both sample data and non-sample data and 25 pictures with only non-sample data 1920×1080×12×5+ 1000000×(5+25)=154416000 bits.

The maximum shared memory usage for the DPB could be defined in a level definition in terms of number of bits in the DPB or in terms of number of reference pictures with sample data in the DPB. In the latter case, a picture with only non-sample data would account for SizeN/(SizeS+SizeN) of a reference picture where SizeN is the bit size of the non-sample data of a reference picture and SizeS is the bit size of the sample data of a reference picture. Following the example above, a reference picture with only non-sample data would account for 4% of a reference picture with both sample data and non-sample data.

In another embodiment, instead of using a single maxDPBSize value as in HEVC, two values are used; maxDPBSizeSampleData and maxDPBSizeNonSampleData, where maxDPBSizeSampleData defines the maximum allowed number of reference pictures in the DPB with sample data and maxDPBSizeNonSampleData defines the maximum allowed number of reference pictures in the DPB with non-sample data. It is also possible to use more than two maximum sizes. For example, to support sample data S and two types N1 and N2 of non-sample data, the corresponding three values of maximum sizes could be named maxDPBSampleData, maxDPBNonSampleDataN1 and maxDPBNonSampleDataN2. Alternatively, these values would not be specified in number of pictures but rather in size in bytes, bits or a combination thereof.

For each defined level, there would preferably be values specified for these maximum limits.

Implementation Example

The following example illustrates one way of implementing an embodiment in connection with HEVC. The below illustrated changes have done to the HEVC specification text [1], in which bold text indicates additions and strikethrough indicates removal of text in relation to [1].

7.3.6.1 General Slice Segment Header Syntax

| slice_segment_header( ) { | Descriptor |
|---|---|
| ... | |
| if( !dependent_slice_segment_flag ) { | |
| ... | |
| if( nal_unit_type != IDR_W_RADL && nal_unit_type != IDR_N_LP ) { | |
| ... | |
| if( long_term_ref_pics_present_flag ) { | |
| for( i= 0; i < num_long_term_sps + num_long_term_pics; i++ ) { | |
| if( i < num_long_term_sps ) { | |
| ... | |
| } else { | |
| ... | |
| used_by_curr_pic_lt_flag[i] | u(1) |
| rps_storage_type_lt[i] | u(1) |
| ... | |

7.3.7 Short-Term Reference Picture Set Syntax

| st_ref_pic_set( stRpsIdx ) { | Descriptor |
|---|---|
| ... | |
| if( inter_ref_pic_set_prediction_flag ) { | |
| ... | |
| for( j = 0; j <= NumDeltaPocs[ RefRpsIdx ]; j++ ) { | |
| used_by_curr_pic_flag[j] | u(1) |
| rps_storage_type[j] | u(1) |
| ... | |
| } else{ | |
| ... | |
| for( i = 0; i < num_negative_pics; i++ ) { | |
| ... | |
| used_by_curr_pic_s0_flag[i] | u(1) |
| rps_storage_type_s0[i] | u(1) |
| } | |
| for( i = 0; i < num_positive_pics; i++ ) { | |
| ... | |
| used_by_curr_pic_s1_flag[i] | u(1) |
| rps_storage_type_s1[i] | u(1) |
| ... | |

7.4.7.1 General Slice Segment Header Semantics

When present, the value of the slice segment header syntax elements slice_pic_parameter_set_id, pic_output_flag, no_output_of_prior_pics_flag, slice_pic_order_cnt_lsb, short_term_ref_pic_set_sps_flag, short_term_ref_pic_set_idx, num_long_term_sps, num_long_term_pics and slice_temporal_mvp_enabled_flag shall be the same in all slice segment headers of a coded picture. When present, the value of the slice segment header syntax elements lt_idx_sps[ i ], poc_lsb_lt[ i ], used_by_curr_pic_lt_flag[ i ], rps_storage_type_lt[ i ], delta_poc_msb_present_flag[ i ] and delta_poc_msb_cycle_lt[ i] shall be the same in all slice segment headers of a coded picture for each possible value of i.

...

rps_storage_type_lt [ i ] specifies the storage type for the i-th entry in the long-term RPS of the current picture. The variable RpsStorageTypeLt [ i ] is derived as follows:
RpsStorageTypeLt [ i ] = rps_storage_type_lt[ i ] ? "all data" : "only non-sample data"

...

7.4.8 Short-Term Reference Picture Set Semantics

...
rps_storage_type[ j ] specifies the storage type for the j-th entry in the source candidate short-term RPS.
...
When inter_ref_pic_set_prediction_flag is equal to 1, the variables DeltaPocS0[ stRpsIdx ][ i ], UsedByCurrPicS0[ stRpsIdx ][ i ], RpsStorageTypeS0[ i] NumNegativePics[ stRpsIdx ], DeltaPocS1[ stRpsIdx ][ i ], UsedByCurrPicS1[ stRpsIdx ][ i ], RpsStorageTypeS1[ i ] and NumPositivePics[ stRpsIdx ] are derived as follows:
i = 0
for( j = NumPositivePics[ RefRpsIdx ] − 1; j >= 0; j- - ) (
  dPoc = DeltaPocS1[ RefRpsIdx ][ j] + deltaRps
  if( dPoc < 0 && use_delta_flag[ NumNegativePics[ RefRpsIdx ] + j ] ) {
    DeltaPocS0[ stRpsIdx ][ i ] = dPoc
    UsedByCurrPicS0[ stRpsIdx ][ i++ ] = used_by_curr_pic_flag[ NumNegativePics[ RefRpsIdx ] + j ]
    RpsStorageTypeS0[ stRpsIdx ][ i++] = rps_storage_type[ NumNegativePics[ RefRpsIdx ] + j] ? "all data" : "only non-sample data"
  }
}
if( deltaRps < 0 && use_delta_flag[ NumDeltaPocs[ RefRpsIdx ] ] ) {     (7-59)
  DeltaPocS0[ stRpsIdx ][ i ] = deltaRps
  UsedByCurrPicS0[ stRpsIdx ][ i++ ] = used_by_curr_pic_flag[ NumDeltaPocs[ RefRpsIdx ] ]
  RpsStorageTypeS0[ stRpsIdx ][ i++] = rps_storage_type[ NumDeltaPocs[ RefRpsIdx ] ] ? "all data" : "only non-sample data"
}
for( j = 0; j < NumNegativePics[ RefRpsIdx ]; j++ ) {
  dPoc = DeltaPocS0[ RefRpsIdx ][ j ] + deltaRps
  if( dPoc < 0 && use_delta_flag[ j ] ) {
    DeltaPocS0[ stRpsIdx ][ i ] = dPoc
    UsedByCurrPicS0[ stRpsIdx ][ i++ ] = used_by_curr_pic_flag[ j ]
    RpsStorageTypeS0[ stRpsIdx ][ i++ ] = rps_storage_type[ j ] ? "all data" : "only non-sample data"
  }
}
NumNegativePics[ stRpsIdx ] = i
i = 0
for( j = NumNegativePics[ RefRpsIdx ] − 1; j >= 0; j- - ) (
  dPoc = DeltaPocS0[ RefRpsIdx ][ j ] + deltaRps
  if( dPoc > 0 && use_delta_flag[ j ] ) (
    DeltaPocS1[ stRpsIdx ][ i ] = dPoc
    UsedByCurrPicS1[ stRpsIdx ][ i++ ] = used_by_curr_pic_flag[ j ]
    RpsStorageTypeS1[ stRpsIdx ][ i++ ] = rps_storage_type[ j ] ? "all data" : "only non-sample data"
  }
}
if( deltaRps > 0 && use_delta_flag[ NumDeltaPocs[ RefRpsIdx ] ] ) {     (7-60)
  DeltaPocS1[ stRpsIdx ][ i ] = deltaRps
  UsedByCurrPicS1[ stRpsIdx ][ i++ ] = used_by_curr_pic_flag[ NumDeltaPocs[ RefRpsIdx ] ]
  RpsStorageTypeS1[ stRpsIdx ][ i++] = rps_storage_type[ NumDeltaPocs[ RefRpsIdx ]] ? "all data" : "only non-sample data"
}
for( j = 0; j < NumPositivePics[ RefRpsIdx ]; j++) {
  dPoc = DeltaPocS1[ RefRpsIdx ][ j ] + deltaRps
  if( dPoc > 0 && use_delta_flag[ NumNegativePics[ RefRpsIdx ] + j ] ) {
    DeltaPocS1[ stRpsIdx ][ i ] = dPoc
    UsedByCurrPicS1[ stRpsIdx ][ i++ ] = used_by_curr_pic_flag[ NumNegativePics[ RefRpsIdx ] + j ]
    RpsStorageTypeS1[ stRpsIdx ][ i++] = rps_storage_type[ NumNegativePics[ RefRpsIdx ] + j ] ? "all data" : "only non-sample data"
  }
}
NumPositivePics[ stRpsIdx ] = i
...
rps_storage_type_s0[ i ] specifies the storage type for the i-th entry in the stRpsIdx-th candidate short-term RPS.
...
rps_storage_type_s1[ i ] specifies the storage type for the i-th entry in the stRpsIdx-th candidate short-term RPS.
When inter_ref_pic_set_prediction_flag is equal to 0, the variables RpsStorageTypeS0[ stRpsIdx ][ i] and RpsStorageTypeS1[ stRpsIdx ][ i ] are derived as follows:
RpsStorageTypeS0[ stRpsIdx ][ i ] = rps_storage_type_s0[ i ] ? "all data" : "only non-sample data"
RpsStorageTypeS1[ stRpsIdx ][ i ] = rps_storage_type_s1[ i ] ? "all data" : "only non-sample data"

8.3.2 Decoding Process for Reference Picture Set

...

Five lists of picture order count values and five lists of RPS storage type values are constructed to derive the RPS. These five ten lists are PocStCurrBefore, PocStCurrAfter, PocStFoll, PocLtCurr, and PocLtFoll, TypeStCurrBefore, TypeStCurrAfter, TypeStFoll, TypeLtCurr and TypeLtFoll with NumPocStCurrBefore, NumPocStCurrAfter, NumPocStFoll, NumPocLtCurr and NumPocLtFoll number of elements, respectively. The five ten lists and the five variables are derived as follows:
- If the current picture is an IDR picture, PocStCurrBefore, PocStCurrAfter, PocStFoll, PocLtCurr, and PocLtFoll, TypeStCurrBefore, TypeStCurrAfter, TypeStFoll, TypeLtCurr and TypeLtFoll are all set to be empty, and NumPocStCurrBefore, NumPocStCurrAfter, NumPocStFoll, NumPocLtCurr and NumPocLtFoll are all set equal to 0.
- Otherwise, the following applies:

```
for( i = 0, j = 0, k = 0; i < NumNegativePics[ CurrRpsIdx ] ; i++ )
  if( UsedByCurrPicS0[ CurrRpsIdx ][ i ] )
    PocStCurrBefore[ j++ ] = PicOrderCntVal + DeltaPocS0[ CurrRpsIdx ][ i ]
    TypeStCurrBefore[ j++ ] = RpsStorageTypeS0[ CurrRpsIdx ][ i ]
  else
    PocStFoll[ k++ ] = PicOrderCntVal + DeltaPocS0[ CurrRpsIdx ][ i ]
    TypeStFoll[ k++ ] = RpsStorageTypeS0[ CurrRpsIdx ][ i ]
NumPocStCurrBefore = j
for( i = 0, j = 0; i < NumPositivePics[ CurrRpsIdx ]; i++ )
  if( UsedByCurrPicS1[ CurrRpsIdx ][ i ] )
    PocStCurrAfter[ j++ ] = PicOrderCntVal + DeltaPocS1[ CurrRpsIdx ][ i ]
    TypeStCurrAfter[ j++ ] = RpsStorageTypeS1[ CurrRpsIdx ][ i ]
  else
    PocStFoll[ k++ ] = PicOrderCntVal + DeltaPocS1[ CurrRpsIdx ][ i ]
    TypeStFoll[ k++ ] = RpsStorageTypeS1[ CurrRpsIdx ][ i ]
NumPocStCurrAfter = j
NumPocStFoll = k                                                         (8-5)
for( i = 0, j = 0, k = 0; i < num_long_term_sps + num_long_term_pics; i++ ) {
  pocLt = PocLsbLt[ i ]
  if( delta_poc_msb_present_flag[ i ] )
      pocLt += PicOrderCntVal - DeltaPocMsbCycleLt[ i ] * MaxPicOrderCntLsb -
      PicOrderCntVal & ( MaxPicOrderCntLsb - 1)
  if( UsedByCurrPicLt[ i ] ) {
    PocLtCurr[ j ] = pocLt
    TypeLtCurr[ j ] = RpsStorageTypeLt[ i ]
    CurrDeltaPocMsbPresentFlag[ j++ ] = delta_poc_msb_present_flag[ i ]
  } else {
    PocLtFoll[ k ] = pocLt
    TypeLtFoll[ k ] = RpsStorageTypeLt[ i ]
    FollDeltaPocMsbPresentFlag[ k++ ] = delta_poc_msb_present_flag[ i ]
  }
}
NumPocLtCurr = j
NumPocLtFoll = k
```
where PicOrderCntVal is the picture order count of the current picture as specified in clause 8.3.1.
...

The derivation process for the RPS and picture marking
are performed according to the following ordered steps:
1. The following applies:

```
for( i = 0; i < NumPocLtCurr; i++ )
  if( !CurrDeltaPocMsbPresentFlag[ i ] )
    if( there is a reference picture picX dataX in the DPB with PicOrderCntVal & ( MaxPicOrderCntLsb
- 1) equal to PocLtCurr[ i ] and nuh_layer_id equal to currPicLayerId )
      if (TypeLtCurr[ i ] is equal to "all data" )
        RefPicSetLtCurr[ i ] = picX dataX
      else
        RefPicSetLtCurr[ i ] = the non-sample data of dataXRefPicSetLtCurr[ i ] = picX
    else
      RefPicSetLtCurr[ i ] = "no reference picture"
  else
    if( there is a reference picture picX dataX in the DPB with PicOrderCntVal equal to PocLtCurr[ i ]
and nuh_layer_id equal to currPicLayerId )
      if (TypeLtCurr[ i ] is equal to "all data" )
        RefPicSetLtCurr[ i ] = picX dataX
      else
        RefPicSetLtCurr[ i ] = the non-sample data of dataX
    else
      RefPicSetLtCurr[ i] = "no reference picture"                       (8-6)
for( i = 0; i < NumPocLtFoll; i++ )
  if( !FollDeltaPocMsbPresentFlag[ i ] )
    if( there is a reference picture picX dataX in the DPB with PicOrderCntVal & ( MaxPicOrderCntLsb
- 1 ) equal to PocLtFoll[ i ] and nuh_layer_id equal to currPicLayerId )
```

```
    if (TypeLtFoll[ i ] is equal to "all data" )
        RefPicSetLtFoll[ i ] = picX dataX
    else
        RefPicSetLtFoll[ i ] = the non-sample data of dataX
    else
        RefPicSetLtFoll[ i ] = "no reference picture"
else
    if( there is a reference picture picX dataX in the DPB with PicOrderCntVal equal to PocLtFoll[ i ]
and nuh_layer_id equal to currPicLayerId )
        if (TypeLtFoll[ i ] is equal to "all data" )
            RefPicSetLtFoll[ i ] = picX dataX
        else
            RefPicSetLtFoll[ i ] = the non-sample data of dataX
    else
        RefPicSetLtFoll[ i ] = "no reference picture"
```

2. All reference pictures that are included in RefPicSetLt-Curr or RefPicSetLtFoll and have nuh_layer_id equal to currPicLayerId are marked as "used for long-term reference".

3. All non-sample data that is included in RefPicSetLtCurr or RefPicSetLtFoll (and have nuh_layer_id equal to currPicLayerId) is marked as "used for long-term reference".

4. The following applies:

```
for( i = 0; i < NumPocStCurrBefore; i++ )
    if( there is a short-term reference picture picX dataX in the DPB with PicOrderCntVal equal to
PocStCurrBefore[ i ] and nuh_layer_id equal to currPicLayerId )
        if (TypeStCurrBefore [ i ] is equal to "all data" )
            RefPicSetStCurrBefore[ i ] = picX dataX
        else
            RefPicSetStCurrBefore[ i ] = the non-sample data of dataX
    else
        RefPicSetStCurrBefore[ i ] = "no reference picture"
for( i = 0; i < NumPocStCurrAfter; i++ )
    if( there is a short-term reference picture picX dataX in the DPB with PicOrderCntVal equal to
PocStCurrAfter[ i ] and nuh_layer_id equal to currPicLayerId )
        if (TypeStCurrAfter [ i ] is equal to "all data" )
            RefPicSetStCurrAfter[ i ] = picX dataX
        else
            RefPicSetStCurrAfter[ i ] = the non-sample data of dataX
    else
        RefPicSetStCurrAfter[ i ] = "no reference picture"                              (8-7)
for( i = 0; i < NumPocStFoll; i++ )
    if( there is a short-term reference picture picX dataX in the DPB with PicOrderCntVal equal to
PocStFoll[ i ] and nuh_layer_id equal to currPicLayerId )
        if (TypeStFoll [ i ] is equal to "all data" )
            RefPicSetStFoll[ i ] = picX dataX
        else
            RefPicSetStFoll[ i ] = the non-sample data of dataX
    else
        RefPicSetStFoll[ i ] = "no reference picture"
```

5. All reference pictures in the DPB that are not included in RefPicSetLtCurr, RefPicSetLtFoll, RefPicSetStCurrBefore, RefPicSetStCurrAfter, or RefPicSetStFoll and have nuh_layer_id equal to currPicLayerId are marked as "unused for reference".

6. All non-sample data in the DPB that are not included in RefPicSetLtCurr, RefPicSetLtFoll, RefPicSetStCurrBefore, RefPicSetStCurrAfter, or RefPicSetStFoll and have nuh_layer_id equal to currPicLayerId is removed from the DPB. For each removal of non-sample data, the DPB data fullness is decremented by one.

It is a requirement of bitstream conformance that the RPS is restricted as follows:

There shall be no entry in Ref PicSetStCurrBefore, RefPicSetStCurrAfter or RefPicSetLtCurr for which one or more of the following are true:

The entry is equal to "no reference picture".
The entry is an SLNR picture and has TemporalId equal to that of the current picture.
The entry is a picture that has Temporal Id greater than that of the current picture.

After the derivation process for the RPS, RefPicSetLtCurr [i] must hold a picture and non-sample data if TypeLtCurr[i] is equal to "all data"

After the derivation process for the RPS, RefPicSetLtCurr [i] must hold non-sample data if TypeLtCurr[i] is equal to "non-sample data"

After the derivation process for the RPS, RefPicSetStCurrAfter [i] must hold a picture and non-sample data if TypeStCurrAfter [i] is equal to "all data"

After the derivation process for the RPS, RefPicSetStCurrAfter [i] must hold non-sample data if TypeStCurrAfter [i] is equal to "non-sample data"

After the derivation process for the RPS, Ref PicSetStCurrBefore [i] must hold a picture and non-sample data if TypeStCurrBefore [i] is equal to "all data"

After the derivation process for the RPS, RefPicSetStCurrBefore [i] must hold non-sample data if TypeStCurrBefore [i] is equal to "non-sample data"

8.3.3.1 General Decoding Process for Generating Unavailable Reference Pictures When this process is invoked, the following applies:
For each RefPicSetStFoll[i], with i in the range of 0 to NumPocStFoll−1, inclusive, that is equal to "no reference picture", a picture is generated as specified in clause 8.3.3.2, and the following applies:
The value of PicOrderCntVal for the generated picture is set equal to PocStFoll[i].
The value of PicOutputFlag for the generated picture is set equal to 0.
The generated picture is marked as "used for short-term reference".
RefPicSetStFoll[i] is set to be the generated data.
The value of nuh_layer_id for the generated data is set equal to nuh_layer_id of the current picture.

8.3.3.2 Generation of One Unavailable Picture

When this process is invoked, an unavailable picture is generated as follows:
The value of each element in the sample array SL for the picture is set equal to 1<<(BitDepthY−1).
When ChromaArrayType is not equal to 0, the value of each element in the sample arrays SCb and SCr for the picture is set equal to 1<<(BitDepthC−1).
The prediction mode CuPredMode[x][y] is set equal to MODE_INTRA for x=0 . . . pic_width_in_luma_samples−1, y=0 . . . pic_height_in_luma_samples−1.
Create non-sample data for the picture.

C.1 General

The HRD operates as follows:
The HRD is initialized at decoding unit 0, with the both the CPB and the DPB being set to be empty (the DPB fullness and DPB data fullness are both set equal to 0).

C.3.2 Removal of Pictures from the DPB

2. The value of NoOutputOfPriorPicsFlag derived for the decoder under test is applied for the HRD, such that when the value of NoOutputOfPriorPicsFlag is equal to 1, all picture storage buffers in the DPB are emptied without output of the pictures they contain, and the DPB fullness and DPB data fullness are both set equal to 0.

C.3.4 Current Decoded Picture Marking and Storage

The current decoded picture is stored in the DPB in an empty picture storage buffer, the DPB fullness is incremented by one, and the current picture is marked as "used for short-term reference". The decoded non-sample data is stored in the DPB marked as "used for short-term reference" and the DPB data fullness is incremented by one.

C.5.2.2 Output and removal of pictures from the DPB

If the current picture is an IRAP picture, all non-sample data is removed from the DPB and the DPB data fullness is set equal to 0.

An aspect of the embodiments relates to a decoding method.

In an embodiment, see FIG. 24, the decoding method comprises storing, in step S1, sample data and non-sample data of a previously decoded picture of a video sequence in a decoder memory, such as DPB. The decoding method also comprises removing, in step S2, the sample data from the decoder memory while keeping the non-sample data in the decoder memory based on information retrieved from a bitstream constituting an encoded representation of the video sequence. The decoding method further comprises decoding, in step S3, a current picture of the video sequence based on the non-sample data stored in the decoder memory.

The information retrieved from the bitstream could include one of the more above mentioned code words rps_storage_type_lt[i], rps_storage_type[i], rps_storage_type_s0[i] and rps_storage_type_s1[i] as illustrative, but non-limiting, example.

In a particular embodiment, see FIG. 25, the decoding method also comprises identifying, in step S12 and in the decoder memory, the non-sample data among non-sample data of different previously decoded pictures of the video sequence based on information retrieved from the bitstream.

The information could be a code word retrieved from the bitstream and used, when decoded, to obtain an index to a list of indicators to different non-sample data from the different previously decoded pictures. The index can then be used to identify what non-sample data that should be used for decoding of the current picture.

Thus, in an embodiment, the decoding method comprises retrieving, in step S10, the information from the bitstream. The method also comprises obtaining, in step S11 and based on the information retrieved from the bitstream, an index to a list of indicators to different non-sample data from the different previously decoded pictures. In this embodiment, step S12 comprises identifying, in the decoder memory, the non-sample data among the non-sample data of said different previously decoded pictures based on the index.

In a particular embodiment, see FIG. 26, the decoding method comprises copying, in step S20, the non-sample data of the previously decoded picture to the decoded current picture. The decoding method also comprises removing, in step S21, the non-sample data of the previously decoded picture from the decoder memory. The decoding method further comprises storing, in step S22, the decoded current picture including the copied non-sample data in the decoder memory.

In a variant of this embodiment, the non-sample data is copied to another previously decoded picture stored in the decoder memory rather than to the decoded current picture. In such a variant, the decoding method comprises copying, in step S20, the non-sample data of the previously decoded picture to another previously decoded picture stored in the decoder memory. The decoding method also comprises removing, in step S21, the non-sample data of the previously decoded picture from the decoder memory.

In a particular embodiment, see FIG. 27, the decoding method comprises marking, in step S30, the sample data in the decoder memory as one of used for reference and unused for reference and marking the non-sample data in the decoder memory as one of used for reference and unused for reference. Data marked as used for reference indicates that the data is available as reference data by a subsequently decoded picture of the video sequence and data marked as unused for reference indicates that the data is not available as reference data by any subsequently decoded picture of the video sequence. In this particular embodiment, removing the sample data in step S2 of FIG. 24 comprises removing the sample data from the decoded picture buffer if the sample data is marked as unused for reference and the previously decoded picture is not needed for output.

In another embodiment, see FIG. 28, the decoding method comprises storing, in step, S40, sample data and non-sample data of a decoded picture of a video sequence in a DPB. The sample data preferably comprises decoded sample values in the decoded picture and the non-sample data preferably comprises decoding parameter values other than the sample values. The decoding method also comprises marking, in step S41, the non-sample data in the DPB as used for reference while marking the sample data in the DPB as unused for reference. Marked as used for reference indicates that the non-sample data is available as reference data (prediction data) by a subsequently decoded picture of the video sequence and marked as unused for reference indicates that the sample data is not available as reference data by any subsequently decoded picture of the video sequence. The decoding method further comprises decoding, in step S43, a current picture of the video sequence at least partly based on the non-sample data marked as used for reference and stored in the DPB.

In a particular embodiment, marking the non-sample data in step S41 comprises marking the non-sample data in the DPB as used for reference while marking the sample data in the DPB as unused for reference based on information retrieved from a bitstream constituting an encoded representation of the video sequence.

The information retrieved from the bitstream could include one of the more above mentioned code words rps_storage_type_lt[i], rps_storage_type[i], rps_storage_type_s0[i] and rps_storage_type_s1[i] as illustrative, but non-limiting, example.

In a particular embodiment, the decoding method comprises identifying, in the DPB, the non-sample data among non-sample data of different decoded pictures of the video sequence based on information retrieved from a bitstream constituting an encoded representation of the video sequence.

The information could be a code word retrieved from the bitstream and used, when decoded, to obtain an index to a list of indicators to different non-sample data from the different previously decoded pictures.

The index can then be used to identify what non-sample data that should be used for decoding of the current picture.

In a particular embodiment, the decoding method comprises copying the non-sample data of the decoded picture to the decoded current picture of the video sequence. The decoding method also comprises removing the non-sample data of the decoded picture from the DPB. The decoding method further comprises storing the decoded current picture including the copied non-sample data in the decoder picture buffer.

In a variant of this embodiment, the non-sample data is copied to another previously decoded picture stored in the DPB rather than to the decoded current picture.

In a further embodiment see FIG. 28, the decoding method comprises storing, in step S40, sample data and non-sample data of a decoded picture of a video sequence in a DPB. The sample data preferably comprises decoded sample values of the decoded picture and the non-sample data preferably comprises decoding parameter values other than the sample values. The decoding method also comprises marking, in step S41, the sample data in the DPB as one of used for reference and unused for reference and marking the non-sample data in the DPB as one of used for reference and unused for reference. Data marked as used for reference indicates that the data is available as reference data by a subsequently decoded picture of the video sequence and data marked as unused for reference indicates that the data is not available as reference data by any subsequently decoded picture of the video sequence. The decoding method also comprises removing, in step S42, the non-sample data from the DPB if the non-sample data is marked as unused for reference and removing the sample data from the DPB if the sample data is marked as unused for reference and the decoded picture is not needed for output. The decoding method further comprises decoding, in step S43, a current picture of the video sequence based on the sample data and/or the non-sample data stored in the DPB and marked as used for reference.

In a particular embodiment, marking the sample data and the non-sample data in step S41 comprises marking the sample data in the DPB as one of used for reference and unused for reference and marking the non-sample data in the DPB as one of used for reference and unused for reference based on information retrieved from a bitstream constituting an encoded representation of the video sequence.

In a particular embodiment, marking the sample data and the non-sample data in step S41 comprises marking the non-sample data in the DPB as used for reference while marking the sample data in the DPB as unused for reference. In this particular embodiment, decoding the current picture in step S43 comprises decoding the current picture of the video sequence at least partly based on the non-sample data marked as used for reference and stored in the DPB.

In a particular embodiment, the information comprises a flag associated with the decoded picture. In this particular embodiment, marking the sample data and the non-sample data in step S41 comprises marking the sample data in the DPB as used for reference and marking the non-sample data in the DPB as used for reference if the flag has a first value and marking the sample data in the DPB as unused for reference and marking the non-sample data in the DPB as used for reference if the flag has a second value.

The information retrieved from the bitstream could include one of the more above mentioned code words rps_storage_type_lt[i], rps_storage_type[i], rps_storage_type_s0[i] and rps_storage_type_s1[i] as illustrative, but non-limiting, example.

In a particular embodiment, marking the sample data and the non-sample data in step S41 comprises marking the sample data in the DPB as one of used for short-term reference, used for long-term reference and unused for reference and marking the non-sample data in the DPB as one of used for short-term reference, used for long-term reference and unused for reference. If the sample data is marked as used for short-term reference, the non-sample data cannot be marked as used for long-term reference and if the sample data is marked as used for long-term reference, the non-sample data cannot be marked as used for short-term reference.

In a particular embodiment, the decoding method comprises identifying, in the DPB, the non-sample data among non-sample data of different decoded pictures of the video sequence based on information retrieved from a bitstream constituting an encoded representation of the video sequence.

The information could be a code word retrieved from the bitstream and used, when decoded, to obtain an index to a list of indicators to different non-sample data from the different previously decoded pictures. The index can then be used to identify what non-sample data that should be used for decoding of the current picture.

In a particular embodiment, removing the non-sample data comprises copying the non-sample data of the decoded picture to the decoded current picture of the video sequence if the non-sample data is marked as unused for reference. Removing the non-sample data also comprises removing the non-sample data of the decoded picture from the DPB if the non-sample data is marked as unused for reference and storing the decoded current picture including the copied non-sample data in the decoder picture buffer if the non-sample data is marked as unused for reference.

In a variant of this embodiment, the non-sample data is copied to another previously decoded picture stored in the DPB rather than to the decoded current picture.

In an embodiment, step S1 of FIG. 24 and/or step S40 of FIG. 28 comprises selectively storing the sample data and the non-sample data in response to a storage type indication specifying what type of data of the previously decoded picture to store in the decoder memory or the DPB.

In an embodiment, the decoding method of the above described embodiments involves up to three pictures of the video sequence. For instance, a first picture comprises the sample data and the non-sample data that is stored in steps S1 and S40 of FIGS. 24 and 28. A second picture is a picture that comprises marking information for the sample data and/or non-sample data of the first picture, e.g., RPS information used when marking sample data and non-sample data of the first picture in step S30 and S41 of FIGS. 27 and 28. The third picture is the current picture that is decoded in steps S3 and S43 of FIGS. 24 and 28, i.e., decoded at a time where the marking has taken effect in steps S2 and S42 of FIGS. 24 and 28. In an embodiment, the second and third picture could be a same picture. In other words, the current picture then comprises the information used for marking sample data and non-sample data of the first picture.

An embodiment relates to a decoding method comprising selectively storing sample data and non-sample data of a previously decoded picture of a video sequence or non-sample data but not sample data of said previously decoded picture in a decoder memory based on a storage type indicator retrieved from a bitstream constituting an encoded representation of said video sequence. The method also comprises decoding a current picture of the video sequence based on the sample data and/or the non-sample data as stored in the decoder memory.

Another aspect of the embodiments relates to an encoding method.

In an embodiment, see FIG. 29, the encoding method comprises storing, in step S50, sample data and non-sample data of a previously encoded picture of a video sequence in an encoder memory. The encoding method also comprises removing, in step S51, the sample data from the encoder memory while keeping the non-sample data in the encoder memory based on information to be included in a bitstream constituting an encoded representation of the video sequence. The encoding method further comprises encoding, in step S52, a current picture of the video sequence based on the non-sample data stored in the encoder memory.

As is known by the person skilled in the art, encoding pictures of a video sequence also involves, as a sub-process, reconstructing the sample values and non-sample data of already encoded pictures. This sub-process is needed in order to make the already encoded pictures available as reference pictures for subsequently encoded pictures of the video sequence. Accordingly, the encoder has access to a DPB as encoder memory, in which sample data and non-sample data of reference pictures are stored. The sub-process of decoding already encoded pictures at the encoder side is typically denoted reconstructing the pictures, i.e., reconstructing sample values and reconstructing parameter values.

Hence, in an embodiment the encoding method also comprise decoding, in step S53, the encoded current picture based on the non-sample data stored in the encoder memory to form a reconstructed current picture.

The above described embodiments of the decoding method may therefore also be performed at the encoder side.

In a particular embodiment, see FIG. 26, the encoding method therefore comprises copying, in step S20, the non-sample data of the previously encoded picture to the reconstructed current picture. The encoding method also comprises removing, in step S21, the non-sample data of the previously encoded picture from the encoder memory. The encoding method further comprises storing, in step S22, the reconstructed current picture including the copied non-sample data in the encoder memory.

In another variant of this particular embodiment, the encoding method comprises copying, in step S20, the non-sample data of the previously encoded picture to another previously reconstructed picture stored in the encoder memory. The encoding method also comprises removing, in step S21, the non-sample data of the previously encoded picture from the encoder memory.

In an embodiment, see FIG. 27, the encoding method comprises marking, in step S30, the sample data in the encoder memory as one of used for reference and unused for reference and marking the non-sample data in the encoder memory as one of used for reference and unused for reference. Data marked as used for reference indicates that the data is available as reference data by a subsequently encoded picture of the video sequence and data marked as unused for reference indicates that the data is not available as reference data by any subsequently encoded picture of the video sequence. In this embodiment, removing the sample data in step S51 comprises removing the sample data from the encoder memory if the sample data is marked as unused for reference and the previously reconstructed picture is not needed for output.

Figure 30:
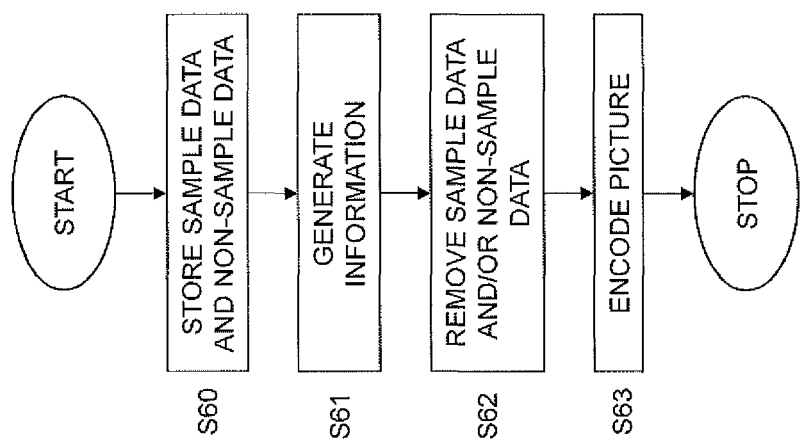
FIG. 30 is a flow chart illustrating an encoding method according to an embodiment.

In another embodiment, see FIG. 30, the encoding method comprises storing, in step S60, sample data and non-sample data of an encoded picture of a video sequence in a DPB. The sample data preferably comprises reconstructed sample values in the encoded picture and the non-sample data preferably comprises reconstructed parameter values other than the sample values. The encoding method also comprises generating, in step S61, information defining marking the non-sample data in the DPB as used for reference while marking the sample data in the DPB as unused for reference. Marked as used for reference indicates that the non-sample data is available as reference data by a subsequently encoded picture of the video sequence and marked as unused for reference indicates that the sample data is not available as reference data by any subsequently encoded picture of the video sequence. The encoding method further comprises encoding, in step S63, a current picture of the video sequence at least partly based on the non-sample data marked as used for reference and stored in the DPB.

The information generated in the encoding method and defining marking of the non-sample data and the sample data is preferably included in the bitstream. This information could include one of the more above mentioned code words rps_storage_type_lt[i], rps_storage_type[i], rps_storage_type_s0[i] and rps_storage_type_s1[i] as illustrative, but non-limiting, example.

In a further embodiment, the encoding method comprises storing, in step S60, sample data and non-sample data of an encoded picture of a video sequence in a DPB. The sample data preferably comprises reconstructed sample values of the encoded picture and the non-sample data preferably comprises reconstructed parameter values other than the sample values. The encoding method also comprises generating, in step S61, information defining marking the sample data in the DPB as one of used for reference and unused for reference and marking the non-sample data in the DPB as one of used for reference and unused for reference. Data marked as used for reference indicates that the data is available as reference data by a subsequently encoded picture of the video sequence and data marked as unused for reference indicates that the data is not available as reference data by any subsequently encoded picture of the video sequence. The encoding method also comprises removing, in step S62, the non-sample data from the DPB if the non-sample data is marked as unused for reference and removing the sample data from the DPB if the sample data is marked as unused for reference and the encoded picture is not needed for output. The encoding method further comprises encoding, in step S63, a current picture of the video sequence based on the sample data and/or the non-sample data stored in the DPB and marked as used for reference.

The information generated in the encoding method and defining marking of the non-sample data and the sample data is preferably included in the bitstream. This information could include one of the more above mentioned code words rps_storage_type_lt[i], rps_storage_type[i], rps_storage_type_s0[i] and rps_storage_type_s1[ i] as illustrative, but non-limiting, example.

In a particular embodiment, generating the information in step S61 comprises generating information defining marking the non-sample data in the DPB as used for reference while marking the sample data in the DPB as unused for reference. In this embodiment, encoding the current picture in step S63 comprises encoding the current picture of the video sequence at least partly based on the non-sample data marked as used for reference and stored in the DPB.

An embodiment relates to an encoding method comprising selectively storing sample data and non-sample data of a previously decoded picture of a video sequence or non-sample data but not sample data of said previously decoded picture in an encoder memory. The method also comprises generating a storage type indicator indicating whether both sample data and non-sample data or only non-sample data of said previously decoded picture is stored in said encoder memory. The method further comprising encoding a current picture of the video sequence based on the sample data and/or the non-sample data as stored in the encoder memory.

In a particular embodiment, the method also comprises including the storage type indicator into a bitstream constituting an encoded representation of said video sequence.

An advantage of the embodiments is that decoder and encoder memory can be utilized more flexibly. The embodiments thereby enable the freedom to store only part of all data associated with a particular reference picture, which makes it possible to optimize the available memory to a much larger extent than before.

Another advantage is memory savings. When it is not necessary to keep the sample data associated with a particular reference picture in the decoder or encoder memory, only the non-sample data could be kept. The memory cost for keeping a large number of non-sample reference data is vastly reduced by not having to store the corresponding sample data in the decoder or encoder memory.

The embodiments may also improve compression efficiency. By enabling many more alternatives for cross-picture prediction of non-sample data at low memory overhead, compression efficiency can be increased.

Combining the splitting of prediction or reference data into different prediction or reference data types provides additional advantages when combined with the RPS concept. One such advantage is that it removes the burden on the encoder to cleverly control the use of parameter prediction in order to avoid mismatches for temporal layer pruning and random access operations. Another advantage is improved error resilience. The RPS design is robust against packet losses so by using the robust RPS mechanisms, error resilience is preserved. By error resilience we here mean the ability to know what has been lost. The RPS provides information which picture that was lost. With the proposed embodiments, the decoder will in case of parameter loss, know which picture that carried the prediction data that was lost. The decoder can then do a better concealment of the loss.

A further aspect of the embodiments relates to a decoder.

In an embodiment, the decoder is configured to store sample data and non-sample data of a previously decoded picture of a video sequence in a decoder memory, such as DPB. The decoder is also configured to remove the sample data from the decoder memory while keeping the non-sample data in the decoder memory based on information retrieved from a bitstream constituting an encoded representation of the video sequence. The decoder is further configured to decode a current picture of the video sequence based on the non-sample data stored in the decoder memory.

In an embodiment, the decoder is configured to identify, in the decoder memory, the non-sample data among non-sample data of different previously decoded pictures of the video sequence based on information retrieved the bitstream.

In an embodiment, the decoder is configured to retrieve the information from the bitstream and obtain, based on the information retrieved from the bitstream, an index to a list of indicators to different non-sample data from the different previously decoded pictures. The decoder is also configured to identify the non-sample data comprises identifying, in the decoder memory, the non-sample data among the non-sample data of the different previously decoded pictures based on the index.

In an embodiment, the decoder is configured to copy the non-sample data of the previously decoded picture to the decoded current picture. The decoder is also configured to remove the non-sample data of the previously decoded picture from the decoder memory. The decoder is further configured to store the decoded current picture including the copied non-sample data in the decoder memory.

In an embodiment, the decoder is configured to copy the non-sample data of the previously decoded picture to another previously decoded picture stored in the decoder memory. The decoder is also configured to remove the non-sample data of the previously decoded picture from the decoder memory.

In an embodiment, the decoder is configured to mark the sample data in the decoder memory as one of used for reference and unused for reference and mark the non-sample data in the decoder memory as one of used for reference and unused for reference. Data marked as used for reference indicates that the data is available as reference data by a subsequently decoded picture of the video sequence and data marked as unused for reference indicates that the data is not available as reference data by any subsequently decoded picture of the video sequence. The decoder is also configured to remove the sample data from the decoder memory if the sample data is marked as unused for reference and the previously decoded picture is not needed for output.

In another embodiment, the decoder is configured to store sample data and non-sample data of a decoded picture of a video sequence in a DPB. The decoder is also configured to mark the non-sample data in the DPB as used for reference while marking the sample data in the DPB as unused for reference. Marked as used for reference indicates that the non-sample data is available as reference data by a subsequently decoded picture of the video sequence and marked as unused for reference indicates that the sample data is not available as reference data by any subsequently decoded picture of the video sequence. The decoder is further configured to decode a current picture of the video sequence at least partly based on the non-sample data marked as used for reference and stored in the DPB.

In a further embodiment, the decoder is configured to store sample data and non-sample data of a decoded picture of a video sequence in a DPB. The decoder is also configured to mark the sample data in the DPB as one of used for reference and unused for reference and marking the non-sample data in the DPB as one of used for reference and unused for reference. Data marked as used for reference indicates that the data is available as reference data by a subsequently decoded picture of the video sequence and data marked as unused for reference indicates that the data is not available as reference data by any subsequently decoded picture of the video sequence. The decoder is further configured to remove the non-sample data from the DPB if the non-sample data is marked as unused for reference and removing the sample data from the DPB if the sample data is marked as unused for reference and the decoded picture is not needed for output. The decoder is additionally configured to decode a current picture of the video sequence based on the sample data and/or the non-sample data stored in the DPB and marked as used for reference.

In an embodiment, the decoder is configured to mark the non-sample data in the DPB as used for reference while marking the sample data in the DPB as unused for reference. The decoder is also configured to decode the current picture of the video sequence at least partly based on the non-sample data marked as used for reference and stored in the DPB.

In an embodiment, the decoder is configured to selectively store the sample data and the non-sample data in response to a storage type indication specifying what type of data of the previously decoded picture to store in the decoder memory or DPB.

An embodiment relates to a decoder configured to selectively store sample data and non-sample data of a previously decoded picture of a video sequence or non-sample data but not sample data of said previously decoded picture in a decoder memory based on a storage type indicator retrieved from a bitstream constituting an encoded representation of said video sequence. The decoder is also configured to decode a current picture of the video sequence based on the sample data and/or the non-sample data as stored in the decoder memory.

Yet another aspect of the embodiments relates to an encoder.

In an embodiment, the encoder is configured to store sample data and non-sample data of a previously encoded picture of a video sequence in an encoder memory. The encoder is also configured to remove the sample data from the encoder memory while keeping the non-sample data in the encoder memory based on information to be included in a bitstream constituting an encoded representation of the video sequence. The encoder is further configured to encode a current picture of the video sequence based on the non-sample data stored in the encoder memory.

In an embodiment, the encoder is configured to decode the encoded current picture based on the non-sample data stored in the encoder memory to form a reconstructed current picture.

In an embodiment, the encoder is configured to copy the non-sample data of the previously encoded picture to the reconstructed current picture. The encoder is also configured to remove the non-sample data of the previously encoded picture from the encoder memory. The encoder is further configured to store the reconstructed current picture including the copied non-sample data in the encoder memory.

In an embodiment, the encoder is configured to copy the non-sample data of the previously encoded picture to another previously reconstructed picture stored in the encoder memory. The decoder is also configured to remove the non-sample data of the previously encoded picture from the encoder memory.

In an embodiment, the encoder is configured to mark the sample data in the encoder memory as one of used for reference and unused for reference and mark the non-sample data in the encoder memory as one of used for reference and unused for reference. Data marked as used for reference indicates that the data is available as reference data by a subsequently encoded picture of the video sequence and data marked as unused for reference indicates that the data is not available as reference data by any subsequently encoded picture of the video sequence. The encoder is also configured to remove the sample data comprises removing the sample data from the encoder memory if the sample data is marked as unused for reference and the previously reconstructed picture is not needed for output.

In another embodiment, the encoder is configured to store sample data and non-sample data of an encoded picture of a video sequence in a DPB. The encoder is also configured to generate information defining marking the non-sample data in the DPB as used for reference while marking the sample data in the DPB as unused for reference. Marked as used for reference indicates that the non-sample data is available as reference data by a subsequently encoded picture of the video sequence and marked as unused for reference indicates that the sample data is not available as reference data by any subsequently encoded picture of the video sequence. The encoder is further configured to encode a current picture of the video sequence at least partly based on the non-sample data marked as used for reference and stored in the DPB.

In a further embodiment, the encoder is configured to store sample data and non-sample data of an encoded picture of a video sequence in a DPB. The encoder is also configured to generate information defining marking the sample data in the DPB as one of used for reference and unused for reference and marking the non-sample data in the DPB as one of used for reference and unused for reference. Data marked as used for reference indicates that the data is available as reference data by a subsequently encoded picture of the video sequence and data marked as unused for reference indicates that the data is not available as reference data by any subsequently encoded picture of the video sequence. The encoder is further configured to remove the non-sample data from the DPB if the non-sample data is marked as unused for reference and removing the sample data from the DPB if the sample data is marked as unused for reference and the encoded picture is not needed for output. The encoder is additionally configured to encode a current picture of the video sequence based on the sample data and/or the non-sample data stored in the DPB and marked as used for reference.

In an embodiment, the encoder is configured to generate information defining marking the non-sample data in the DPB as used for reference while marking the sample data in the DPB as unused for reference. The encoder is also configured to encode the current picture of the video sequence at least partly based on the non-sample data marked as used for reference and stored in the DPB.

An embodiment relates to an encoder configured to selectively store sample data and non-sample data of a previously decoded picture of a video sequence or non-sample data but not sample data of said previously decoded picture in an encoder memory. The encoder is also configured to generate a storage type indicator indicating whether both sample data and non-sample data or only non-sample data of said previously decoded picture is stored in said encoder memory. The encoder is further configured to encode a current picture of the video sequence based on the sample data and/or the non-sample data as stored in the encoder memory.

In a particular embodiment, the encoder also configured to include the storage type indicator into a bitstream constituting an encoded representation of said video sequence.

It will be appreciated that the methods, method steps and devices, device functions described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g., by reprogramming of the existing software or by adding new software components.

Figure 8:
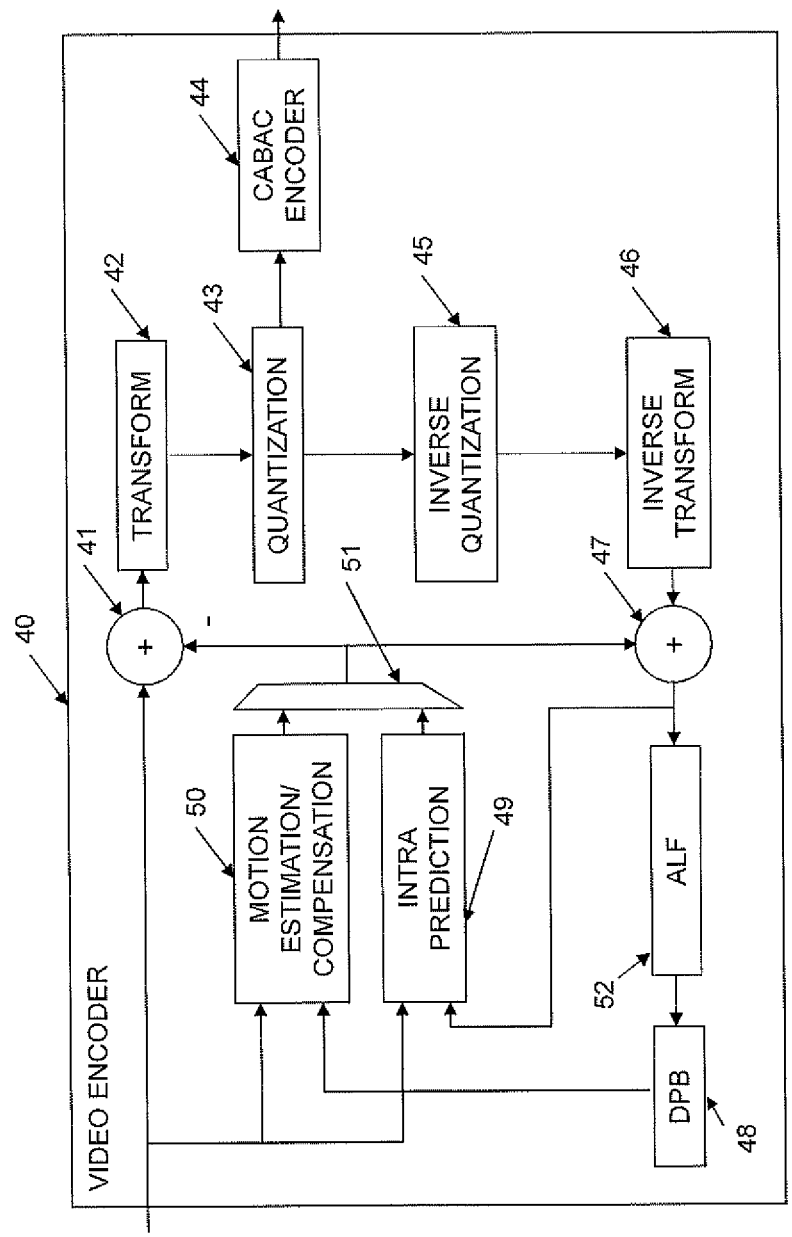
FIG. 8 schematically illustrates a video encoder according to an embodiment.

FIG. 8 is a schematic block diagram of a video encoder 40 according to an embodiment.

A current sample block in a current picture is predicted by performing a motion estimation by a motion estimator 50 from already encoded and reconstructed sample block(s) in the same picture and/or in reference picture(s). The result of the motion estimation is a motion vector in the case of inter prediction. The motion vector is utilized by a motion compensator 50 for outputting an inter prediction of the sample block.

An intra predictor 49 computes an intra prediction of the current sample block. The outputs from the motion estimator/compensator 50 and the intra predictor 49 are input in a selector 51 that either selects intra prediction or inter prediction for the current sample block. The output from the selector 51 is input to an error calculator in the form of an adder 41 that also receives the sample values of the current sample block. The adder 41 calculates and outputs a residual error as the difference in sample values between the sample block and its prediction, i.e., prediction block.

The error is transformed in a transformer 42, such as by a discrete cosine transform (DCT), and quantized by a quantizer 43 followed by coding in an encoder 44, such as by a CABAC encoder. In inter coding, also the estimated motion vector is brought to the encoder 44 for generating the coded representation of the current sample block.

The transformed and quantized residual error for the current sample block is also provided to an inverse quantizer 45 and inverse transformer 46 to reconstruct the residual error. This residual error is added by an adder 47 to the prediction output from the motion compensator 50 or the intra predictor 49 to create a reconstructed sample block that can be used as prediction block in the prediction and coding of other sample blocks. This reconstructed sample block is, in an embodiment, filtered by an ALF filter 52. The filtered sample block is then temporarily stored in a DPB 48, where it is available to the intra predictor 49 and the motion estimator/compensator 50.

Hence, in an embodiment, sample data includes the reconstructed sample values of the sample block stored in the DPB 48, whereas non-sample data includes ALF parameter values used by the ALF filter 52 and/or CABAC probability states used by the CABAC encoder 44.

Figure 9:
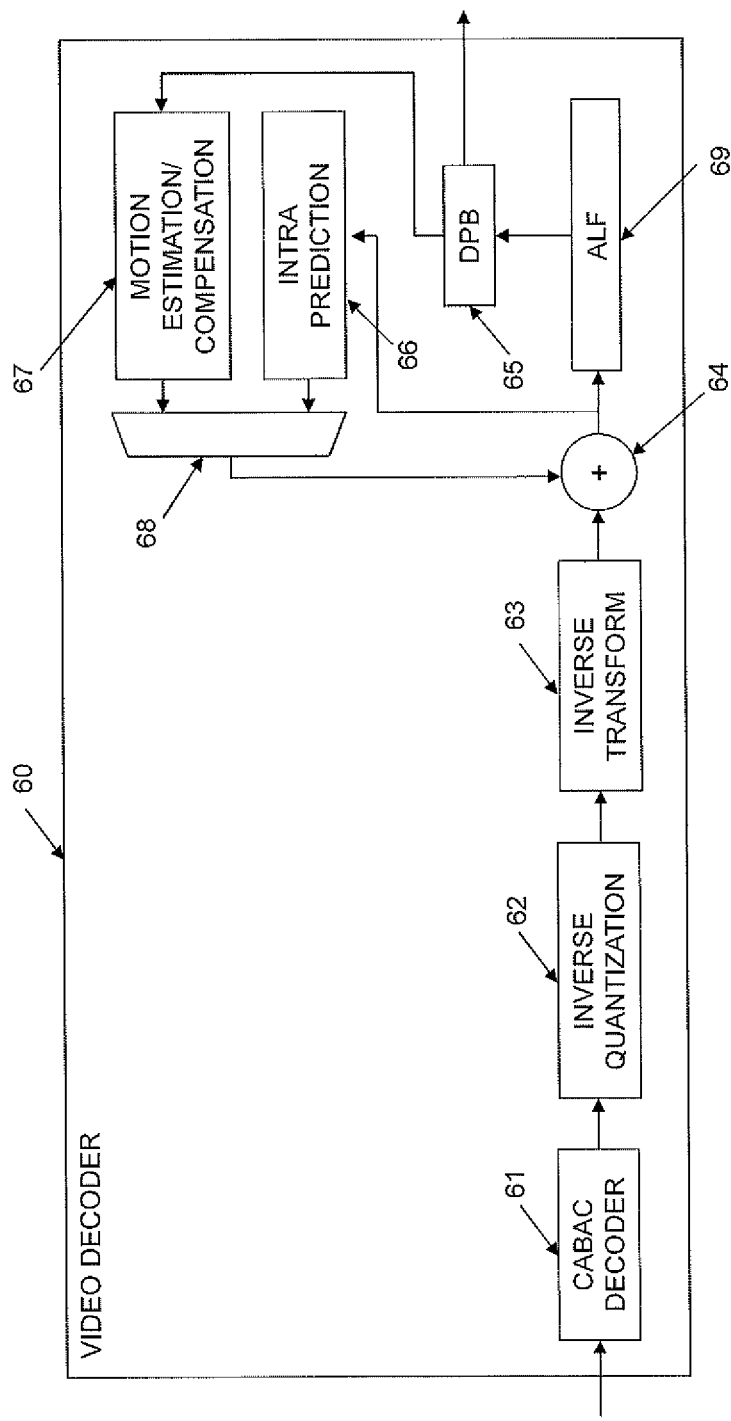
FIG. 9 schematically illustrates a video decoder according to an embodiment.

FIG. 9 is a schematic block diagram of a video decoder 60 according to the embodiments. The video decoder 60 comprises a decoder 61, such as CABAC decoder, for decoding a bitstream comprising an encoded representation of a sample block to get a quantized and transformed residual error. The residual error is dequantized in an inverse quantizer 62 and inverse transformed by an inverse transformer 63 to get a decoded residual error.

The decoded residual error is added in an adder 64 to the sample prediction values of a prediction block. The prediction block is determined by a motion estimator/compensator 67 or intra predictor 66, depending on whether inter or intra prediction is performed. A selector 68 is thereby interconnected to the adder 64 and the motion estimator/compensator 67 and the intra predictor 66. The resulting decoded sample block output from the adder 64 is input to an ALF filter 69. The filtered sample block enters a DPB 65 and can be used as prediction block for subsequently decoded sample blocks. The DPB 65 is thereby connected to the motion estimator/compensator 67 to make the stored sample blocks available to the motion estimator/compensator 67. The output from the adder 64 is preferably also input to the intra predictor 66 to be used as an unfiltered prediction block. The filtered sample block is furthermore output from the video decoder 60, such as output for display on a screen.

In the embodiments disclosed in FIGS. 8 and 9 the ALF filter has been implemented as a so-called in-loop filter. In an alternative implementation, the ALF filter is arranged to perform so called post-processing filtering. In such a case, the ALF filter operates on the output pictures outside of the loop formed by the adder 64, the DPB 65, the intra predictor 66, the motion estimator/compensator 67 and the selector 68 in FIG. 9.

Figure 10:
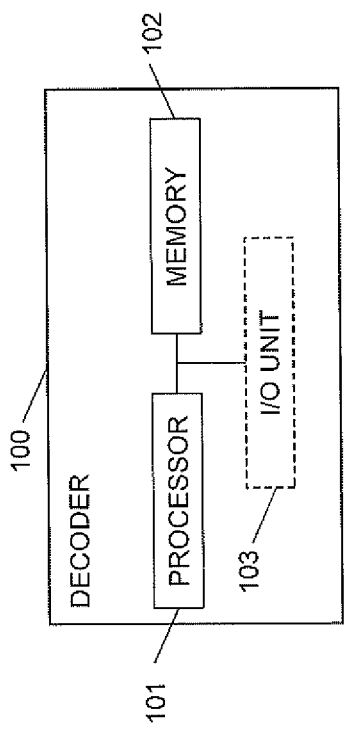
FIG. 10 is a block diagram illustrating a decoder according to an embodiment.

FIG. 10 is a schematic block diagram illustrating an example of a decoder 100 based on a processor-memory implementation according to an embodiment. In this particular example, the decoder 100 comprises a processor 101, such as processing circuitry, and a memory 102. The memory 102 comprises instructions executable by the processor 101.

Figure 11:
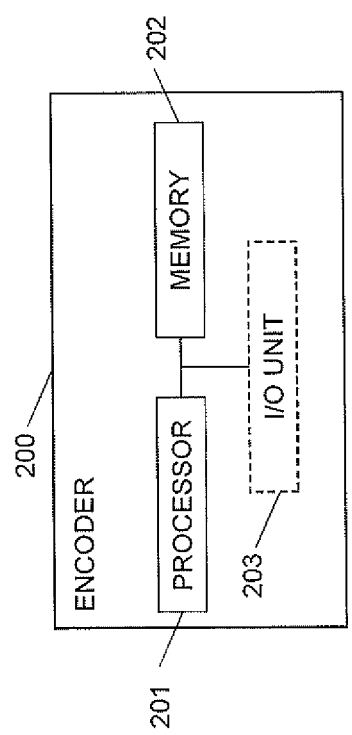
FIG. 11 is a block diagram illustrating an encoder according to an embodiment.

FIG. 11 is a corresponding schematic block diagram illustrating an example of an encoder 200 based on a processor-memory implementation according to an embodiment. In this particular example, the encoder 200 comprises a processor 201, such as processing circuitry, and a memory 202. The memory 202 comprises instructions executable by the processor 201.

In an embodiment, the processors 101, 201 of FIGS. 10 and 11 are operative to perform the processes as previously described herein.

Hence, in an embodiment the processor 101 is operative to store the sample data and the non-sample data, remove the sample data from the decoder memory while keeping the non-sample data in the decoder memory, and decode the current picture.

In another embodiment, the processor 101 is operative to store the sample data and the non-sample data, mark the sample data and the non-sample data, remove the non-sample data and the sample, and decode the current picture.

Correspondingly, the processor 201 is operative to store the sample data and the non-sample data, remove the sample data from the encoder memory while keeping the non-sample data in the decoder memory, and encode the current picture.

In another embodiment, the processor 201 is operative to store the sample data and the non-sample data, generate the information, remove the non-sample data and the sample, and encode the current picture.

The DPB may be present in the memory 102, 201 shown in FIGS. 10 and 11, or could constitute or be present in another memory (not shown) in the decoder 100 and encoder 200.

Optionally, the decoder 100 and the encoder 200 may also include a respective communication circuit, represented by an input/output (I/O) unit 103, 203 in FIGS. 10 and 11. The I/O unit 103, 203 may include functions for wired and/or wireless communication with other devices and/or network nodes in a wired or wireless communication network. In a particular example, the I/O unit 103, 203 may be based on radio circuitry for communication with one or more other nodes, including transmitting and/or receiving information. The I/O unit 103, 203 may be interconnected to the processor 101, 201 and/or memory 102, 202. By way of example, the I/O unit 103, 203 may include any of the following: a receiver, a transmitter, a transceiver, I/O circuitry, input port(s) and/or output port(s).

Figure 12:
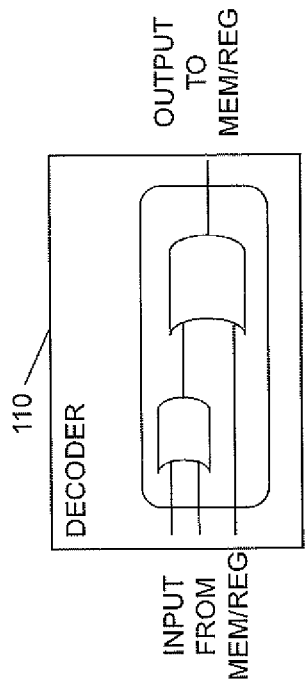
FIG. 12 is a block diagram illustrating a decoder according to another embodiment.
Figure 13:
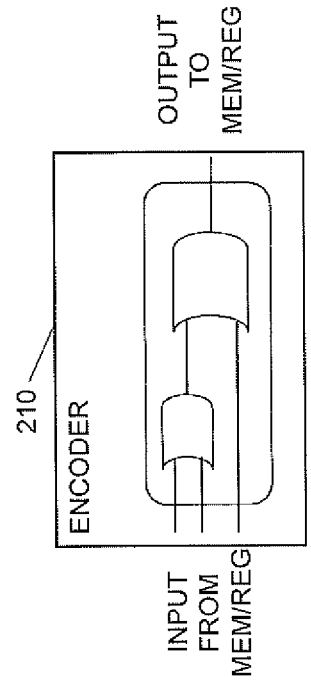
FIG. 13 is a block diagram illustrating an encoder according to another embodiment.

FIG. 12 is a schematic block diagram illustrating another example of a decoder 110 based on a hardware circuitry implementation according to an embodiment. FIG. 13 is a corresponding block diagram illustrating another example of an encoder 210 based on a hardware circuitry implementation according to an embodiment. Particular examples of suitable hardware circuitry include one or more suitably configured or possibly reconfigurable electronic circuitry, e.g., Application Specific Integrated Circuits (ASICs), FPGAs, or any other hardware logic such as circuits based on discrete logic gates and/or flip-flops interconnected to perform specialized functions in connection with suitable registers (REG), and/or memory units (MEM).

FIG. 14 is a schematic block diagram illustrating yet another example of a decoder 120 based on combination of both processor(s) 122, 123 and hardware circuitry 124, 125 in connection with suitable memory unit(s) 121. The decoder 120 comprises one or more processors 122, 123, memory 121 including storage for software (SW) and data, and one or more units of hardware circuitry 124, 125. The overall functionality is thus partitioned between programmed software for execution on one or more processors 122, 123, and one or more pre-configured or possibly reconfigurable hardware circuits 124, 125. The actual hardware-software partitioning can be decided by a system designer based on a number of factors including processing speed, cost of implementation and other requirements.

FIG. 15 is a corresponding schematic block diagram illustrating yet another example of an encoder 220 based on combination of both processor(s) 222, 223 and hardware circuitry 224, 225 in connection with suitable memory unit(s) 221. The encoder 220 comprises one or more processors 222, 223, memory 221 including storage for software (SW) and data, and one or more units of hardware circuitry 224, 225. The overall functionality is thus partitioned between programmed software for execution on one or more processors 222, 223, and one or more pre-configured or possibly reconfigurable hardware circuits 224, 225. The actual hardware-software partitioning can be decided by a system designer based on a number of factors including processing speed, cost of implementation and other requirements.

Figure 16:
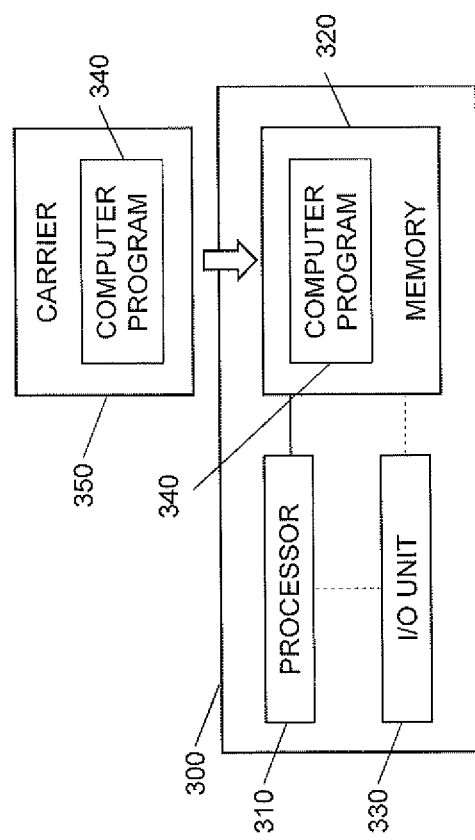
FIG. 16 schematically illustrate a computer program based implementation of an embodiment.

FIG. 16 is a schematic diagram illustrating an example of a device 300, such as decoder or encoder, according to an embodiment. In this particular example, at least some of the steps, functions, procedures, modules and/or blocks described herein are implemented in a computer program 340, which is loaded into the memory 320 for execution by processing circuitry including one or more processors 310. The processor(s) 310 and memory 320 are interconnected to each other to enable normal software execution, An optional I/O unit 330 may also be interconnected to the processor(s) 310 and/or the memory 320 to enable input and/or output of relevant data, such as original pictures of a video sequence to be encoded and a bitstream constituting an encoded representation of the video sequence, or the bitstream and decoded pictures of the video sequence to be output for display.

The term 'processor' should be interpreted in a general sense as any circuitry, system or device capable of executing program code or computer program instructions to perform a particular processing, determining or computing task.

The processing circuitry including one or more processors 310 is thus configured to perform, when executing the computer program 340, well-defined processing tasks such as those described herein.

The processing circuitry does not have to be dedicated to only execute the above-described steps, functions, procedure and/or blocks, but may also execute other tasks.

In a particular embodiment, the computer program 340 comprises instructions, which when executed by at least one processor 310, cause the at least one processor 310 to store sample data and non-sample data of a previously decoded picture of a video sequence in the memory 320. The at least one processor 310 is also caused to remove the sample data from the memory 320 while keeping the non-sample data in the memory 320 based on information retrieved from a bitstream constituting an encoded representation of the video sequence. The at least one processor 310 is further caused to decode a current picture of the video sequence based on the non-sample data stored in the memory 320.

In another particular embodiment, the computer program 340 comprises instructions, which when executed by at least one processor 310, cause the at least one processor 310 to store sample data and non-sample data of a decoded picture of a video sequence in a DPB in the memory 320. The at least one processor 310 is also caused to mark the non-sample data in the DPB as used for reference while marking the sample data in the DPB as unused for reference. Marked as used for reference indicates that the non-sample data is available as reference data by a subsequently decoded picture of the video sequence and marked as unused for reference indicates that the sample data is not available as reference data by any subsequently decoded picture of the video sequence. The at least one processor 310 is further caused to decode a current picture of the video sequence at least partly based on the non-sample data marked as used for reference and stored in the DPB.

In a further particular embodiment, the computer program 340 comprises instructions, which when executed by at least one processor 310, cause the at least one processor 310 to store sample data and non-sample data of a decoded picture of a video sequence in a DPB in the memory 320. The at least one processor 310 is also caused to mark the sample data in the DPB as one of used for reference and unused for reference and mark the non-sample data in the DPB as one of used for reference and unused for reference. Data marked as used for reference indicates that the data is available as reference data by a subsequently decoded picture of the video sequence and data marked as unused for reference indicates that the data is not available as reference data by any subsequently decoded picture of the video sequence. The at least one processor 310 is further caused to remove the non-sample data from the DPB if the non-sample data is marked as unused for reference and remove the sample data from the DPB if the sample data is marked as unused for reference and the decoded picture is not needed for output. The at least one processor 310 is additionally caused to decode a current picture of the video sequence based on the sample data and/or the non-sample data stored in the DPB and marked as used to for reference.

In yet another particular embodiment, the computer program 340 comprises instructions, which when executed by at least one processor 310, cause the at least one processor 310 to store sample data and non-sample data of a previously encoded picture of a video sequence in the memory 320. The at least one processor 310 is also caused to remove the sample data from the memory 320 while keeping the non-sample data in the memory 320 based on information to be included in a bitstream constituting an encoded representation of the video sequence. The at least one processor 310 is further caused to encode a current picture of the video sequence based on the non-sample data stored in the memory 320.

In another particular embodiment, the computer program 340 comprises instructions, which when executed by at least one processor 310, cause the at least one processor 310 to store sample data and non-sample data of an encoded picture of a video sequence in a DPB of the memory 320. The at least one processor 310 is also caused to generate information defining marking the non-sample data in the DPB as used for reference while marking the sample data in the DPB as unused for reference. Marked as used for reference indicates that the non-sample data is available as reference data by a subsequently encoded picture of the video sequence and marked as unused for reference indicates that the sample data is not available as reference data by any subsequently encoded picture of the video sequence. The at least one processor 310 is further caused to encode a current picture of the video sequence at least partly based on the non-sample data marked as used for reference and stored in the DPB.

In a further particular embodiment, the computer program 340 comprises instructions, which when executed by at least one processor 310, cause the at least one processor 310 to store sample data and non-sample data of an encoded picture of a video sequence in a DPB in the memory 320. The at least one processor 310 is also caused to generate information defining marking the sample data in the DPB as one of used for reference and unused for reference and marking the non-sample data in the DPB as one of used for reference and unused for reference. Data marked as used for reference indicates that the data is available as reference data by a subsequently encoded picture of the video sequence and data marked as unused for reference indicates that the data is not available as reference data by any subsequently encoded picture of the video sequence. The at least one processor 310 is further caused to remove the non-sample data from the DPB if the non-sample data is marked as unused for reference and remove the sample data from the DPB if the sample data is marked as unused for reference and the encoded picture is not needed for output. The at least one processor 310 is additionally caused to encode a current picture of the video sequence based on the sample data and/or the non-sample data stored in the DPB and marked as used for reference.

The proposed technology also provides a carrier 350 comprising the computer program 340. The carrier 350 is one of an electronic signal, an optical signal, an electromagnetic signal, a magnetic signal, an electric signal, a radio signal, a microwave signal, or a computer-readable storage medium.

By way of example, the software or computer program 340 may be realized as a computer program product, which is normally carried or stored on a computer-readable medium 350, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program 340 may thus be loaded into the operating memory 320 of a device 300 for execution by the processing circuitry 310 thereof.

The method steps and processes presented herein may be regarded as computer processes, when performed by one or more processors. A corresponding decoder or encoder may be defined as a group of function modules, where each step performed by the processor corresponds to a function module. In this case, the function modules are implemented as a computer program running on the processor.

The computer program residing in memory may, thus, be organized as appropriate function modules configured to perform, when executed by the processor, at least part of the steps and/or tasks described herein.

Figure 17:
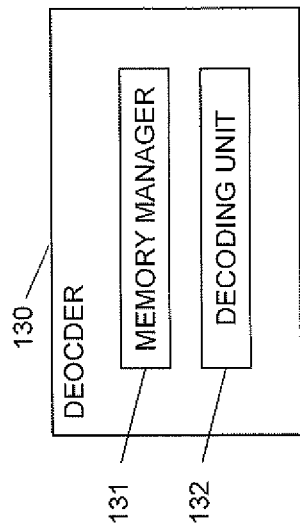
FIG. 17 is a block diagram illustrating a decoder according to yet another embodiment.

FIG. 17 is a schematic block diagram of an embodiment of a decoder 130. The decoder 130 comprises a memory manager 131 for storing sample data and non-sample data of a previously decoded picture of a video sequence in a decoder memory. The memory manager 131 is also for removing the sample data from the decoder memory while keeping the non-sample data in the decoder memory based on information retrieved from a bitstream constituting an encoded representation of the video sequence. The decoder 130 also comprises a decoding unit 132 for decoding a current picture of the video sequence based on the non-sample data stored in the decoder memory.

Figure 18:
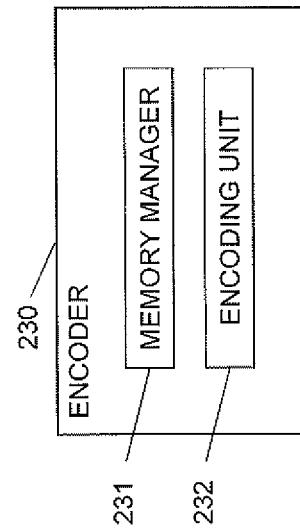
FIG. 18 is a block diagram illustrating an encoder according to yet another embodiment.

FIG. 18 is a corresponding schematic block diagram of an embodiment of an encoder 230. The encoder 230 comprises a memory manager 231 for storing sample data and non-sample data of a previously encoded picture of a video sequence in an encoder memory. The memory manager 231 is also for removing the sample data from the encoder memory while keeping the non-sample data in the encoder memory based on information to be included in a bitstream constituting an encoded representation of the video sequence. The encoder 230 also comprises an encoding unit 232 for encoding a current picture of the video sequence based on the non-sample data stored in the encoder memory.

FIG. 19 is another schematic block diagram of an embodiment of a decoder 140. The decoder 140 comprises a memory manager 141 for storing sample data and non-sample data of a decoded picture of a video sequence in a DPB. The decoder 140 also comprises a marking unit 142 for marking the non-sample data in the DPB as used for reference while marking the sample data in the DPB as unused for reference. The decoder 140 further comprises a decoding unit 143 for decoding a current picture of the video sequence at least partly based on the non-sample data marked as used for reference and stored in the DPB.

In another embodiment, the decoder 140 comprises a memory manager 141 for storing sample data and non-sample data of a decoded picture of a video sequence in a DPB. The decoder 140 also comprises a marking unit 142 for marking the sample data in the DPB as one of used for reference and unused for reference and marking the non-sample data in the DPB as one of used for reference and unused for reference. The memory manager 141 is also for removing the non-sample data from the DPB if the non-sample data is marked as unused for reference and removing the sample data from the DPB if the sample data is marked as unused for reference and the decoded picture is not needed for output. The decoder 140 further comprises a decoding unit 143 for decoding a current picture of the video sequence based on the sample data and/or the non-sample data stored in the DPB and marked as used for reference.

FIG. 20 is a corresponding schematic block diagram of an embodiment of an encoder 240. The encoder 240 comprises a memory manager 241 for storing sample data and non-sample data of an encoded picture of a video sequence in a DPB. The encoder 240 also comprises a generator 242 for generating information defining marking the non-sample data in the DPB as used for reference while marking the sample data in the DPB as unused for reference. The encoder further comprises an encoding unit 243 for encoding a current picture of the video sequence at least partly based on the non-sample data marked as used for reference and stored in the DPB.

In another embodiment, the encoder 240 comprises a memory manager 241 for storing sample data and non-sample data of an encoded picture of a video sequence in a DPB. The encoder 240 also comprises a generator 242 for generating information defining marking the sample data in the DPB as one of used for reference and unused for reference and marking the non-sample data in the DPB as one of used for reference and unused for reference. The memory manager 241 is also for removing the non-sample data from the DPB if the non-sample data is marked as unused for reference and removing the sample data from the DPB if the sample data is marked as unused for reference and the encoded picture is not needed for output. The encoder 240 further comprises an encoding unit 243 for encoding a current picture of the video sequence based on the sample data and/or the non-sample data stored in the DPB and marked as used for reference.

Figure 21:
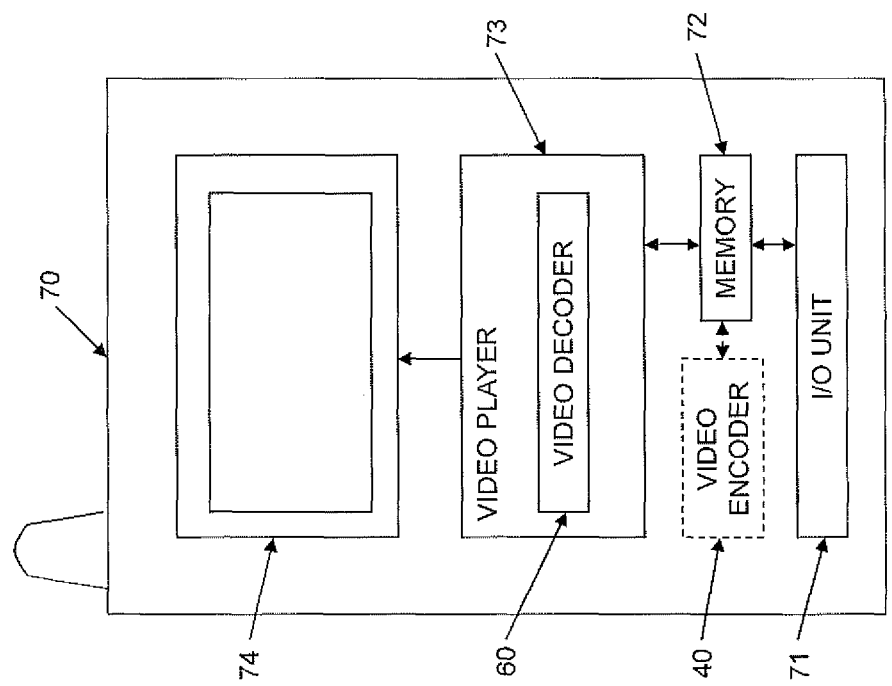
FIG. 21 is a schematic block diagram of a user equipment according to an embodiment.

FIG. 21 is a schematic block diagram of a user equipment 70 housing a video decoder 60. The user equipment 70 can be any device having video decoding functions that operates on an encoded bitstream to thereby decode the bitstream and make the video sequence available for display on a screen 74. Non-limiting examples of such devices include video cameras, mobile telephones, smart phones and other portable video players, tablets, lap tops, desktops, notebooks, personal video recorders, multimedia players, video streaming servers, set-top boxes, TVs, computers, decoders, game consoles, etc.

The user equipment 70 comprises a memory 72 configured to store encoded video data. The encoded video data can have been generated by the user equipment 70 itself. Alternatively, the encoded video data is generated by some other device and wirelessly transmitted or transmitted by wire to the user equipment 70. The user equipment 70 then comprises a transceiver (transmitter and receiver) or I/O unit 72 to achieve the data transfer.

The encoded video data is brought from the memory 72 to a video decoder 60, such as the video decoder illustrated in FIG. 9 or the decoder illustrated in any of FIGS. 10, 12, 14, 17, 19. The video decoder 60 decodes the encoded video data into decoded pictures. The decoded pictures are provided to a video player 73 that is configured to play out the decoded pictures as a video sequence on a screen 74 of or connected to the user equipment 70.

In FIG. 21, the user equipment 70 has been illustrated as comprising both the video decoder 60 and the video player 73, with the video decoder 60 implemented as a part of the video player 73. This should, however, merely be seen as an illustrative but non-limiting example of an implementation embodiment for the user equipment 70. Also distributed implementations are possible where the video decoder 60 and the video player 73 are provided in two physically separated devices are possible and within the scope of user equipment 70 as used herein. The screen 74 could also be provided as a separate device connected to the user equipment 70, where the actual data processing is taking place.

The user equipment 70 may also, or alternatively, comprise a video encoder 40, such as the video encoder of FIG. 8 or the encoder illustrated in any of FIGS. 11, 13, 15, 18, 20. The video encoder 40 is then configured to encode pictures received by the I/O unit 71 and/or generated by the user equipment 70 itself. In the latter case, the user equipment 70 preferably comprises a video engine or video recorder, such as in the form of or connected to a video camera.

The encoder and/or decoder of the embodiments may alternatively be implemented in a network device or equipment being or belonging to a network node in a communication network. Such a network equipment may be a device for converting video according to one video coding standard to another video coding standard, i.e., transcoding. The network equipment can be in the form of or comprised in a radio base station, a Node-B or any other network node in a communication network, such as a radio-based network.

It is becoming increasingly popular to provide computing services, hardware and/or software, in network equipment, such as network devices, nodes and/or servers, where the resources are delivered as a service to remote locations over a network. By way of example, this means that functionality, as described herein, can be distributed or re-located to one or more separate physical devices, nodes or servers. The functionality may be re-located or distributed to one or more jointly acting physical and/or virtual machines that can be positioned in separate physical node(s), i.e., in the so-called cloud. This is sometimes also referred to as cloud computing, which is a model for enabling ubiquitous on-demand network access to a pool of configurable computing resources such as networks, servers, storage, applications and general or customized services.

Figure 22:
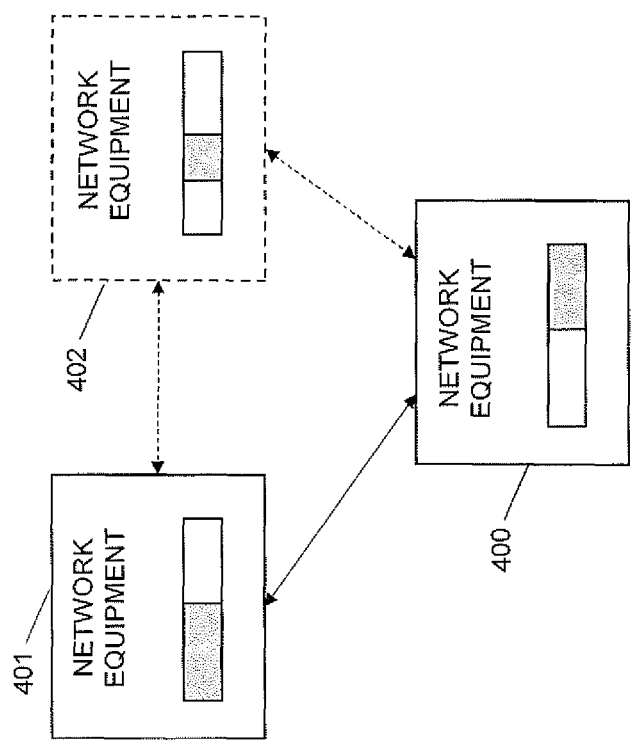
FIG. 22 schematically illustrates a distributed implementation among network equipment.

FIG. 22 is a schematic diagram illustrating an example of how functionality can be distributed or partitioned between different network equipment in a general case. In this example, there are at least two individual, but interconnected network equipment 400, 401, which may have different functionalities, or parts of the same functionality, partitioned between the network equipment 400, 401. There may be additional network devices 302 being part of such a distributed implementation. The network equipment 400, 401, 402 may be part of the same wireless or wired communication system, or one or more of the network devices may be so-called cloud-based network devices located outside of the wireless or wired communication system.

Figure 23:
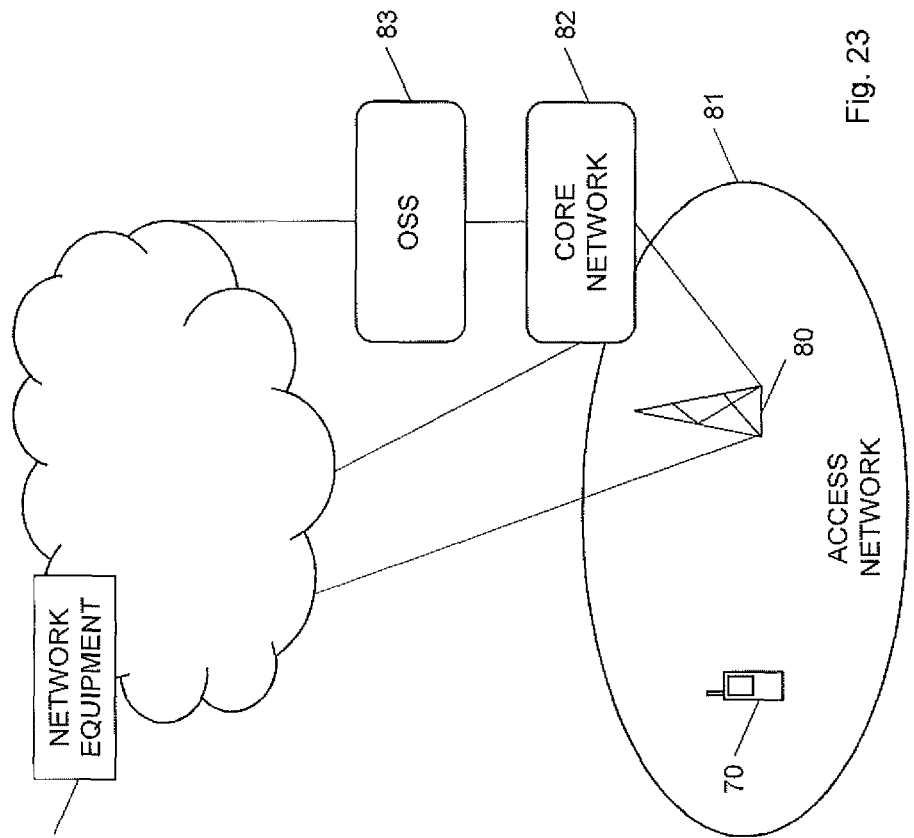
FIG. 23 is a schematic illustration of an example of a wireless communication system with one or more cloud-based network equipment according to an embodiment.

FIG. 23 is a schematic diagram illustrating an example of a wireless communication network or system, including an access network 81 and a core network 82 and optionally an operations and support system (OSS) 83 in cooperation with one or more cloud-based network equipment 400. The figure also illustrates a user equipment 70 connected to the access network 81 and capable of conducting wireless communication with a base station representing an embodiment of a network node 80.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] ITU-T Telecommunication Standardization Sector of ITU, H.265 (04/2015), SERIES H: AUDIOVISUAL AND MULTIMEDIA SYSTEMS, Infrastructure of audiovisual services—Coding of moving video, High efficiency video coding

The invention claimed is:

1. A decoding method comprising:
    storing sample data and non-sample data of a previously decoded picture of a video sequence in a decoder memory;
    removing said sample data from said decoder memory while keeping said non-sample data in said decoder memory based on information retrieved from a bitstream constituting an encoded representation of said video sequence; and
    decoding a current picture of said video sequence based on said non-sample data stored in said decoder memory, wherein
    said sample data consists of color component values,
    said non-sample data does not comprise any color component values, and
    any luma value is a color component value; as a result, said non-sample data does not comprise any luma value.

2. The method of claim 1, further comprising identifying, in said decoder memory, said non-sample data among non-sample data of different previously decoded pictures of said video sequence based on information retrieved from said bitstream.

3. The method of claim 2, further comprising:
    retrieving said information from said bitstream; and
    obtaining, based on said information retrieved from said bitstream, an index to a list of indicators to different non-sample data from said different previously decoded pictures, wherein
    identifying said non-sample data comprises identifying, in said decoder memory, said non-sample data among said non-sample data of said different previously decoded pictures based on said index.

4. The method of claim 1, further comprising:
    copying said non-sample data of said previously decoded picture to said decoded current picture;
    removing said non-sample data of said previously decoded picture from said decoder memory; and
    storing said decoded current picture including said copied non-sample data in said decoder memory.

5. The method of claim 1, further comprising:
    copying said non-sample data of said previously decoded picture to another previously decoded picture stored in said decoder memory; and
    removing said non-sample data of said previously decoded picture from said decoder memory.

6. The method of claim 1, further comprising:
    marking said sample data in said decoder memory as one of used for reference and unused for reference and marking said non-sample data in said decoder memory as one of used for reference and unused for reference, wherein data marked as used for reference indicates that said data is available as reference data by a subsequently decoded picture of said video sequence and data marked as unused for reference indicates that said data is not available as reference data by any subsequently decoded picture of said video sequence, wherein
    removing said sample data comprises removing said sample data from said decoder memory if said sample data is marked as unused for reference and said previously decoded picture is not needed for output.

7. The method of claim 1, wherein storing said sample data and said non-sample data comprises selectively storing said sample data and said non-sample data in response to a storage type indication specifying what type of data of said previously decoded picture to store in said decoder memory.

8. A decoding method comprising:
    storing sample data and non-sample data of a previously decoded picture of a video sequence in a decoded picture buffer;
    marking said sample data in said decoded picture buffer as one of used for reference and unused for reference and marking said non-sample data in said decoded picture buffer as one of used for reference and unused for reference, wherein data marked as used for reference indicates that said data is available as reference data by a subsequently decoded picture of said video sequence and data marked as unused for reference indicates that said data is not available as reference data by any subsequently decoded picture of said video sequence;
    removing said non-sample data from said decoded picture buffer if said non-sample data is marked as unused for reference and removing said sample data from said decoded picture buffer if said sample data is marked as unused for reference and said decoded picture is not needed for output; and
    decoding a current picture of said video sequence based on said sample data and/or said non-sample data stored in said decoded picture buffer and marked as used for reference, wherein
    said sample data consists of color component values,
    said non-sample data does not comprise any color component values, and
    any luma value is a color component value; as a result, said non-sample data does not comprise any luma value.

9. The method of claim 8, wherein
    marking said sample data and said non-sample data comprises marking said non-sample data in said decoded picture buffer as used for reference while marking said sample data in said decoded picture buffer as unused for reference; and decoding said current picture comprises decoding said current picture of said video sequence at least partly based on said non-sample data marked as used for reference and stored in said decoded picture buffer.

10. An encoding method comprising:

storing sample data and non-sample data of a previously encoded picture of a video sequence in an encoder memory;

removing said sample data from said encoder memory while keeping said non-sample data in said encoder memory based on information to be included in a bitstream constituting an encoded representation of said video sequence; and encoding a current picture of said video sequence based on said non-sample data stored in said encoder memory, wherein said sample data consists of color component values, said non-sample data does not comprise any color component values, and any luma value is a color component value; as a result, said non-sample data does not comprise any luma value.

11. The method of claim 10, further comprising decoding said encoded current picture based on said non-sample data stored in said encoder memory to form a reconstructed current picture.

12. The method of claim 11, further comprising:

copying said non-sample data of said previously encoded picture to said reconstructed current picture;

removing said non-sample data of said previously encoded picture from said encoder memory; and storing said reconstructed current picture including said copied non-sample data in said encoder memory.

13. The method of claim 11, further comprising:

copying said non-sample data of said previously encoded picture to another previously reconstructed picture stored in said encoder memory; and removing said non-sample data of said previously encoded picture from said encoder memory.

14. The method of claim 10, further comprising:

marking said sample data in said encoder memory as one of used for reference and unused for reference and marking said non-sample data in said encoder memory as one of used for reference and unused for reference, wherein data marked as used for reference indicates that said data is available as reference data by a subsequently encoded picture of said video sequence and data marked as unused for reference indicates that said data is not available as reference data by any subsequently encoded picture of said video sequence, wherein removing said sample data comprises removing said sample data from said encoder memory if said sample data is marked as unused for reference and said previously reconstructed picture is not needed for output.

15. An encoding method comprising:

storing sample data and non-sample data of an encoded picture of a video sequence in a decoded picture buffer;

generating information defining marking said sample data in said decoded picture buffer as one of used for reference and unused for reference and marking said non-sample data in said decoded picture buffer as one of used for reference and unused for reference, wherein data marked as used for reference indicates that said data is available as reference data by a subsequently encoded picture of said video sequence and data marked as unused for reference indicates that said data is not available as reference data by any subsequently encoded picture of said video sequence;

removing said non-sample data from said decoded picture buffer if said non-sample data is marked as unused for reference and removing said sample data from said decoded picture buffer if said sample data is marked as unused for reference and said encoded picture is not needed for output; and encoding a current picture of said video sequence based on said sample data and/or said non-sample data stored in said decoded picture buffer and marked as used for reference, wherein said sample data consists of color component values, said non-sample data does not comprise any color component values, and any luma value is a color component value; as a result, said non-sample data does not comprise any luma value.

16. The method of claim 15, wherein generating said information comprises generating information defining marking said non-sample data in said decoded picture buffer as used for reference while marking said sample data in said decoded picture buffer as unused for reference; and encoding said current picture comprises encoding said current picture of said video sequence at least partly based on said non-sample data marked as used for reference and stored in said decoded picture buffer.

17. A decoder comprising:

a processor; and a memory comprising instructions executable by said processor, wherein said processor is operative to perform the decoding method of claim 1.

18. A decoder comprising:

a processor; and a memory comprising instructions executable by said processor, wherein said processor is operative to perform the decoding method of claim 8.

19. An encoder comprising:

a processor; and a memory comprising instructions executable by said processor, wherein said processor is operative to perform the encoding method of claim 10.

20. An encoder comprising:

a processor; and a memory comprising instructions executable by said processor, wherein said processor is operative to perform the encoding method of claim 15.

21. The decoding method of claim 1, wherein said sample data comprises luma values.

22. The decoding method of claim 1, wherein said non-sample data includes one or more decoding parameter values.

23. The decoding method of claim 22, wherein said non-sample data is at least one of ALF parameter values, CABAC probability states, ALF filter types, ALF coefficients, sample adaptive offset (SAO) parameter, coding tree structure parameters, interpolation filter coefficient, scaling matrices, a slice segment address, a slice type, a color plane identifier, a collocated reference index, weighted prediction parameters, merge candidate parameters, QP modification parameters, deblocking parameters, entry point data, or slice header extension.

* * * * *